US010810509B2

(12) United States Patent
Miyazaki

(10) Patent No.: US 10,810,509 B2
(45) Date of Patent: Oct. 20, 2020

(54) ARTIFICIAL INTELLIGENCE APPARATUS AUTONOMOUSLY EXPANDING KNOWLEDGE BY INPUTTING LANGUAGE

(71) Applicant: Hiroaki Miyazaki, Yokohama (JP)

(72) Inventor: Hiroaki Miyazaki, Yokohama (JP)

( * ) Notice: Subject to any disclaimer, the term of this patent is extended or adjusted under 35 U.S.C. 154(b) by 0 days.

(21) Appl. No.: 15/280,022

(22) Filed: Sep. 29, 2016

(65) Prior Publication Data

US 2017/0109655 A1    Apr. 20, 2017

Related U.S. Application Data

(63) Continuation of application No. PCT/JP2015/083834, filed on Nov. 25, 2015.

(30) Foreign Application Priority Data

Oct. 16, 2015 (JP) ................................. 2015-217071

(51) Int. Cl.
*G06N 20/00* (2019.01)
*G06N 5/02* (2006.01)
(Continued)

(52) U.S. Cl.
CPC ........... *G06N 20/00* (2019.01); *G06F 40/253* (2020.01); *G06F 40/30* (2020.01); *G06N 5/022* (2013.01)

(58) Field of Classification Search
None
See application file for complete search history.

(56) References Cited

U.S. PATENT DOCUMENTS 9,020,956 B1 *   4/2015   Barr .................. G06F 17/30864
                                                        707/748
2010/0023311 A1 *   1/2010   Subrahmanian ...... G06F 17/275
                                                        704/2
(Continued)

FOREIGN PATENT DOCUMENTS

JP          06-242930 A        9/1994
JP          2015-164064        9/2015
(Continued)

OTHER PUBLICATIONS

Definition of "artificial intelligence" from https://www.merriam-webster.com (Year: 2018).*

(Continued)

*Primary Examiner* — Alan Chen
(74) *Attorney, Agent, or Firm* — Buchanan Ingersoll & Rooney PC

(57) ABSTRACT

An artificial intelligence apparatus includes an input processor configured to convert input information to patterns, an analyzer configured to analyze the input information, a recorder configured to record the information, a controller configured to perform at least one of a development of a process according to a type of a sentences and an intention, a search for information and a logic development to solve a problem, an execution of a process and activating a program, a generalization of information and a procedure, an update to a better knowledge and a logic, a search and an arrangement of information about an interesting field and an item, recording and updating of information, connective relations and relationship, and a transition control between information to a goal and an output processor configured to convert the patterns to information or control signals.

27 Claims, 26 Drawing Sheets

(51) Int. Cl.
    *G06F 40/30*          (2020.01)
    *G06F 40/253*       (2020.01)

(56)                  References Cited

U.S. PATENT DOCUMENTS

2014/0019443 A1*   1/2014   Golshan ............ G06F 17/30867
                                                               707/723
2014/0172857 A1*   6/2014   Powell .............. G06F 17/30702
                                                                707/738
2016/0239751 A1*   8/2016   Mosterman ............ G06N 7/005

FOREIGN PATENT DOCUMENTS

JP         2015-165414 A     9/2015
JP         2016-006678 A     1/2016
JP         2016-026356 A     2/2016

OTHER PUBLICATIONS

International Search Report (PCT/ISA/210) dated Mar. 8, 2016, by the Japanese Patent Office as the International Searching Authority for International Application No. PCT/JP2015/083834.
Written Opinion (PCT/ISA/237) dated Mar. 8, 2016, by the Japanese Patent Office as the International Searching Authority for International Application No. PCT/JP2015/083834.

* cited by examiner

FIG. 3

Example of information evaluation

| NO | Items of analysis | Methods | Actions after analysis |
|---|---|---|---|
| 1 | reliability | Check the reliability of information (obtained when, who, where?) | reliable : record with the results of analysis not reliable : reject, ignore |
| 2 | fields/themes | Detect fields and themes using the words of information | record the fields and themes |
| 3 | types | Record the types about (truth, facts, definitions, rules, common sense) by the human instructions. Recognize the types about (explanations, assumptions, predictions, opinions, impressions) using the words (I think, It seems, I assume etc.) Recognize the types of sentences (normal, interrogative, imperative, conditional, exclamatory sentences) using the words of information | record the types of information |
| 4 | interest | Compare the designated fields and themes and that of information | matching : record the interest not matching : reject, ignore |
| 5 | newness | Compare the patterns of input information and related information in the recorder | new : record information not new : reject, ignore |
| 6 | validity | Check the validity by comparing the elements of input information and recorded information (M,S,O,H1,H2,H3,H4,V) Select and record the sentences which have higher reliability when the validity differs. | valid : record the validity not valid : select the sentences which have higher reliability |

Functions to update better knowledge and logics

ARTIFICIAL INTELLIGENCE APPARATUS AUTONOMOUSLY EXPANDING KNOWLEDGE BY INPUTTING LANGUAGE

TECHNICAL FIELD

The disclosed embodiments relate generally to artificial intelligence apparatus and robots which autonomously process problems and improve knowledge, and a software to execute those functions. This is achieved by constructing a knowledge system autonomously by inputting information, analyzing a situation and recognizing a problem based on the constructed knowledge, searching for information to perform a conversation and translation and to solve a problem; activating a program to execute processes; generating information necessary to solve the problem; and recording the information into the knowledge system. A source, reliability, newness, field, theme, topic, intention, subject, predicate, modifier of the subject, modifier of the predicate, relation of the modifiers, when, where, who, what, how, why, type of a sentence (normal, interrogative, imperative, conditional sentences, truth, fact, rules, common sense, right and wrong, definitions, logic, explanation, hypotheses, prediction, opinion, impression, rumor), numerical expression, physical expression, chemical expression, symbol regarding the input information and relation with recorded information are analyzed. The analyzed result is arranged into a structure which enables an easy searching and recorded in a recorder.

The disclosed embodiments relate to artificial intelligence apparatus and robots, which record a history of the input information, analyze a situation, context of a sentence and a problem based on the recorded history, and solve the problem by activating a program necessary for solving the problem, and a software to execute those functions. The disclosed embodiments relate to artificial intelligence and robots which solve "a symbol grounding problem" regarding whether to knowledge system is consistent with a reality and realize the artificial intelligence apparatus which is free of a black box and does not go out of control.

BACKGROUND ART

The conventional artificial intelligence techniques based on an expert system or neural network are known. The expert system is a rule based program, and it is configured by a static reasoning engine and variable knowledge data base. The reasoning engine deduces by using a group of rules, such as a proposition reasoning, predicate reasoning, epistemic logic, modal logic, temporal logic, fuzzy logic. The knowledge data base is constructed by inputting knowledges of experts. It is reported that there is a conflict between rules upon formulating, and it is difficult to cope with an illogical processing.

The neural network is generally configured by connecting artificial neuron including an input layer, middle layer and output layer in series by using a synapse learning. A back propagation method is generally used for the synapse learning.

However, the following disadvantages are reported in papers.

In the back propagation method:
Transfer functions used for the artificial neuron have to be differential;
Convergence speed of the learning is very slow;
It does not guarantee the convergence of the learning;
It sometime leads to local optimum points, not a broad-based optimized solution; and etc.

Additionally, a recent investigation indicates that there are some defects that a process is in a black box and a validity of the processes is not clear.

CITATION LIST

Patent Literature

SUMMARY OF INVENTION

Technical Problem

The conventional artificial intelligence techniques based on the expert system or neural network are known. However, the expert system and neural network have some disadvantages to realize the artificial intelligence.

The expert system can cope with only logical items using the group of rules. However, it is difficult to express the human thinking patterns by using only logic. The knowledge data base is constructed by inputting the knowledges of the experts, however, it is reported that there are rules which conflict with the other rules.

The neural network is generally configured by connecting artificial neuron including the input layer, middle layer and output layer in series using synapse learning. The back propagation method is generally used for the synapse learning. However, the following disadvantages are reported in the papers.

In the back propagation method:
The transfer functions used for the artificial neuron have to be differential;
The convergence speed of the learning is very slow;
It does not guarantee the convergence of learning;
It sometime leads to the local optimum points, not the broad-based optimized solution; and etc.

Additionally, a recent investigation indicates there are defects that the process is in the black box and the validity of the processes is not clear.

A target of the embodiments to realize an artificial intelligence apparatus which can cope with both logical and illogical items like human thinking processes, construct a knowledge system autonomously by inputting information (language). Additionally, another target is to solve the symbol grounding problem whether the knowledge system constructed in the artificial intelligence is actually consistent and processed, and realize the artificial intelligence apparatus which is free of the black box so that the human can understand the process and the apparatus does not go out of control.

Solution to Problem

The thoughts of the human are expressed by words, number, numerical expressions and symbols, etc. The language is expressed by combinations of the words. Then, the thoughts of the human are expressed by the combinations of words, number, numerical expressions and symbols. By converting the words, number, numerical expressions and symbols to corresponding patterns respectively, the thoughts of the human are expressed by the combinations of the patterns. And transitions of the human thinking patterns are expressed by transitions of combinations of the patterns.

It is possible to express concepts like words and sentences by using patterns. It is possible to activate related patterns and execute various processes using the activated patterns.

It is also possible to activate programs triggered by activation of a pattern and include its result into the other pattern. Furthermore, it is possible to perform a process of image information, a transition from an image pattern to an image patterns, a transition from an image pattern to a language pattern, a transition from a sound pattern to a language pattern, a generation of signals to drive an actuator. The patterns can cope with various items and concepts.

It is possible to express various concepts by the combinations of patterns which are converted from words, number, numerical expressions and symbols. There is no restriction for the forms of patterns converted from words, number, numerical expressions and symbols as long as it can be identified. The combinations of patterns are also patterns. In the embodiments, the identification numbers are used for the patterns. For example, the identification number corresponding the word 'I' is '0', postposition 'ha' is '1', 'teacher' is '2', . . . 'cube' is '101', 'sphere' is '102', 'density' is '103', 'weight' is '104' . . . 'artificial intelligence' is '169', 'occupation' is '170' . . . etc. It is possible to cope with new words by adding the identification numbers respectively. Various thoughts and concepts are expressed using the combinations of patterns (in the embodiments, combinations of identification numbers associated with the words and symbols are arranged in a structure of subjects, verbs, objects, complements and modifiers).

The artificial intelligence apparatus of the embodiments can express the human thoughts and information by using patterns, and express the transitions of the human thinking patterns and information by the transitions between the patterns autonomously. One or more memory units record several types of information. Examples of the types are the patterns which express the information, connective information with the other memory unit expressing relations between the information (the number of connections, address of the connection, a relation with the patterns to connect), conditions to activate (compare and match conditions), results of the analysis (sources of the information, reliability, newness, fields, theme, types of the sentences, etc.).

The types of the sentences include normal sentences, interrogative sentences, imperative sentences, conditional sentences, exclamatory sentences, the truth, facts, rules, common sense, definitions, logic, explanations, hypotheses, predictions, opinions, impressions, rumors, conversion to the absolute words, numerical expressions, physical expressions and chemical expressions and symbols, etc. They are analyzed and recorded in the memory units.

The pattern is recorded by analyzing subjects, predicates, modifiers of the subjects, modifiers of the predicates, relations of the modifiers, the types of the sentences, numerical expressions, physical expressions, chemical expressions, symbols, when, where, who, what, how, why, and a relation with recorded information and by arranging into the structure which enables easy search.

When the information is input, a field of the information, a theme of the information, a type of a sentence, a structure (subjects, predicates, modifiers of the subjects, modifiers of the predicates, relations of the modifiers, the types of the sentences, numerical expressions, physical expressions, chemical expressions, symbols, when, where, who, what, how, why) is analyzed, and the value (reliability, newness, validity, compatibility, right and wrong, relations) of the information is evaluated by comparing with the information recorded in the memory units. As a result, the information evaluated as valuable and safe is arranged in the field, theme, and the relation with the recorded information and is recorded in the memory unit.

There are various types of relations between the information, such as, cause and result, phenomenon and reason, explanation and result, outline and detail, similar meanings, opposite meanings, main body and summary, main body and relational information etc. These relations are set by the human instructions or set autonomously by learning the relations between information.

The information is recorded as a knowledge system by relating to relational information. When the information is input, the memory unit corresponding to the information is activated, checks the connective information (e.g., an address of a memory unit to be connected, a relations with the memory unit to be connected) and selects and activates an appropriate memory unit, and gets necessary information. It is possible to identify a center of the process of the artificial intelligence apparatus by monitoring the activation memory units. This monitoring corresponds to identifying a center of a thinking process of the human. This also corresponds to identifying a location of an execution pointer of a compiled command code in the conventional computer.

The conventional artificial intelligence uses a techniques to search for relational information by using words in the information as a search key and select a candidate which has the largest correlation. This technique has a disadvantage that it might select a wrong candidate when it has the largest correlation with a query. According to the embodiments of the invention, it is possible to construct a right knowledge system by confirming a validity and compatibility with the recorded information and selecting right information, in a way as a child gets intelligence educated rightly while excluding wrong information. The relations between the words (e.g., same meaning, opposite meaning) can be identified in the constructed knowledge system. Thus, it is possible to detect information which is wrong or against rules or morals by comparing and checking the consistency with the recorded information. The wrong information is detected and rejected, then the knowledge system stays safe.

It is very difficult to evaluate the validity and safety of the outputs made by the conventional artificial intelligence techniques, such as the data searching and the neural network. This is because the human cannot trace a process in a form or logic which the human can understand since the correlation is calculated with a complicated searching algorithm in the data searching. Additionally, in the neural network, a result is generated by strengthening a connection between a number of artificial neurons by learning. It is difficult to trace a process of the learning in a form or logic which the human can understand. That is, there is a defect in the conventional artificial intelligence (the data searching and the neural network) that the process is in a black box. If the conventional artificial intelligence has the black box, it is very dangerous since the human cannot confirm that the artificial intelligence does not violate human rules and morals when functions, performance and autonomy thereof is improved. The human cannot detect that the artificial intelligence is violating the human rules and morals accidentally and cannot remove that violation. The human cannot evaluate the validity and safety of a result of the process even if the result is generated based on a knowledge which violates the human rules and morals accidentally.

On the other hand, in the embodiments, the information in each memory unit (i.e., conditions for comparison, conditions to satisfy (activate), patterns, a connection of the patterns, a relation between the patterns having the connection, a result of analysis of the pattern) are expressed as patterns converted from words, numbers and symbols which the human can understand. Additionally, since the connections of the memory units and relations of the connections are clear, it is easy to trace a logical extension. In the artificial intelligence apparatus of the embodiments, all processes can be monitored. The artificial intelligence apparatus of the embodiments is a very clear system since it has a formation and structure understood by the human. That is, the artificial intelligence apparatus of the embodiments is a system that the human can understand and confirm the validity and safety about the processes and results which the artificial intelligence apparatus generates. Additionally, the artificial intelligence apparatus of the embodiments constructs the knowledge system while confirming that the new information is consistent to moral and rules based on truth and facts. The information which is inconsistent to the human moral and rules is detected and deleted. Thus, incorrect knowledge (e.g., the knowledge violating the moral and rules of the human) is not included in the knowledge system. Therefore, the artificial intelligence apparatus can be managed not to violate the rules, common sense and moral defined by the human at the stage that autonomy, functions and performances of the artificial intelligence apparatus are dramatically improved. The knowledge system is constructed based on the truth, facts, rules, common sense, definitions and logics, and the information which is inconsistent to those is not included in the knowledge system. All processes are expressed by the words and symbols that human can understand, and therefore, the knowledge system has a transparency.

The "symbol grounding problem" is a problem to solve whether the knowledge system constructed in the artificial intelligence apparatus is consistent or inconsistent to a reality. As for the symbol grounding problem, source data of the knowledge system of the artificial intelligence apparatus is "language, sentence, word, symbol, numeral equations, physical equations, chemical equations" corresponding to a reality and instructed by the human. Additionally, the knowledge system is constructed by converting the source data into patterns and defining a relation between the information as a relation between the patterns. Therefore, the knowledge system is equal to "the reality" corresponding to the input information and has a consistency.

In the artificial intelligence apparatus of the embodiments, the information including language, word, sentence, and etc., corresponding to the knowledge and intelligence constructed by the humans is input and evaluated. The artificial intelligence apparatus evaluates a relation between the information evaluated as valuable and safe and the recorded information to include the information in the knowledge system autonomously. The knowledge system is autonomously expanded by comparing the input information with the information recorded in the knowledge system, adding an analysis result to the information which is evaluated as valuable and safe. The knowledge system is the data base which is equivalent to the human intelligence, and used for solving problems and making conversations.

The artificial intelligence apparatus of the embodiments searches for related data corresponding to the given problems by using the knowledge system. The contact address and the relations of the data which has relation with the searched data are also recognized. It is possible to proceed with the thinking processing to the target autonomously by selecting the appropriate relation out of the several candidates. The artificial intelligence apparatus of the embodiments forms a relation between the information autonomously by inputting the information corresponding to truth, facts, rules, common sense, definitions, logics, etc. When the information is input, various patterns are activated and the relation between the concepts is strengthened by the human instructions or learning. The sentences do not exist alone but have relations to each other and are positioned in the contexts. The later sentences have influence of the former ones. The artificial intelligence apparatus includes a function that activates patterns corresponding to the input sentences and strengthens the connective relations between the patterns by recording an activation history of the former patterns in each memory unit for the connective relations. This function enables the artificial intelligence apparatus to learn so that all patterns corresponding to sentences are activated according to the relations with the associated sentences, i.e., context. By inputting many words and sentences, a network of the contexts are formed autonomously. And when a concept (e.g., words, sentences) is input, the concept transits according to the formed contexts.

As the relations between the information corresponding to truth, facts, rules, common sense, definitions and logics are formed, the knowledge system corresponding to them is constructed autonomously. When the learning proceeds, the artificial intelligence apparatus can recognize that the information is consistent or inconsistent to the information recorded already. This means that the artificial intelligence apparatus gets the knowledge corresponding to truth, facts, rules, common sense, definitions and logics. The transitions between the information are performed using the formed contexts, and also performed using the associated key words in the information. It is possible to make conversations like a human by using the various combinations of thinking pattern transitions.

The connections between the information can be formed according to the instruction by the human by activating a pattern corresponding to one concept (word, sentence) and activating another concept later. The connections between the concepts are formed so that transitions are made from the former activated pattern to the later activated pattern. According to this, when the same concept is activated, the patter transits automatically, according to the formed relations. When there are many destinations to transit, a relation suitable to a situation is set automatically or by the human instructions and an appropriate candidate having the relation is selected. The automatic setting of the relations is performed by detecting a goal of the transitions of the thinking pattern and situations.

It is easy and efficient to implement a basic processing (analysis and control of the information) of the embodiments by programming language. On the other hand, the knowledge system, in which the information is connected one another, is used for individual processing corresponding to the individual thoughts. The system evaluates the input information and proceeds according to the result of evaluation. It is possible to change memory units to activate according to the situations, and cope with various processing in a flexible manner. Of course, it is possible to cope with a fixed processing having fixed sequences like a general programming.

The knowledge system of the artificial intelligence apparatus is constructed by inputting knowledge in the form of language accumulated by the human up to now, and the artificial intelligence apparatus solves the problems using the knowledge system. The artificial intelligence apparatus can activate programs developed by the human automatically and use a result of the processing. Therefore, it is possible to realize the artificial intelligence apparatus which has both of a flexibility of a human and processing capability of a computer to solve the problem. A system having functions and flexibility of the artificial intelligence apparatus of the embodiments and processing capacity of a computer can be constructed by programming the contents of the processing and implementing the programs in the artificial intelligence apparatus, or by connecting the artificial intelligence apparatus and the computer in which the programs are implemented and executing the programs implemented in the computer by the artificial intelligence apparatus.

It is possible to change and add processing during the operation easily in the embodiments. Generally, in a programming process using a programming language, it is necessary to design, install, and compile programs again to change the process. In contrast, in the embodiments, a change and addition of a process can be made by changing the connective information between corresponding patterns locally. Therefore, it is not necessary to reconstruct the system overall such as recompiling. Additionally, the conventional programs do not work if variables, constants and functions are not defined precisely in the programs. On the other hand, in the embodiment, the information is expressed by using patterns corresponding to the language, and searching of information is performed by using combinations of patterns (corresponding to combinations of words and elements of sentences). Therefore, even if there is an ambiguity, it is possible to search for the information using the combination of related words. (For the information searching, the combination of the patterns corresponding to the language is used, and various detection and processes such as a detection of a sentence having the same meaning, a detection of a newness, confirmation of a consistency with the recorded information and detection of differences, etc., are performed.)

The artificial intelligence apparatus of the embodiments searches for information by using the combinations of patterns which correspond to the language (words, symbols). Thus, the searching method in the artificial intelligence apparatus is similar to the human thinking. The artificial intelligence apparatus includes functions for searching and recording information in an associated memory system. When new information is generated, the information is registered/recorded by using a pattern combining the language (words, symbols) as a search key. The registered/recorded information can be searched easily with the searching pattern combining the language (words, symbols). This enables to realize a flexible system which is free of the restriction that variables, constants used for the programs have to be defined precisely.

Further, it is possible to perform serial processing in which a process corresponding to the condition is performed based on a situation (i.e., confirming whether the conditions are met or not based on a pattern and a result of an analysis of the pattern), and if a next condition exists in the performed process, the process is determined by analyzing the condition. The artificial intelligence apparatus of the embodiments can understand the information and perform necessary processes by defining a thinking process (i.e., a group of conditional sentences) which is the same as a thinking of the human to solve the problem. As a result of the process, the new information which is generated during the processes is recorded as the search key by using appropriate combinations of relational words. Thus, it is possible to search the information generated in the other process by generating the search key combining the relational words easily. That is, the artificial intelligence apparatus can includes the generated information and knowledge into the knowledge system and use them easily in the future. It is necessary to define all variables and constants before defining programs in the conventional system. On the other hand, the artificial intelligence apparatus of the embodiments can include new information generated as a result of the process into the knowledge system and can use the information in the other process when it is necessary. It is possible to select appropriate memory area to be searched, such as a whole knowledge area or a limited area which is processed at the most recent, according to the process.

The features of the embodiments are explained above. The artificial intelligence apparatus may be a hybrid system that includes the conventional programs and performs processing instructed processes with flexibility (e.g., interpretation of language, use of the knowledge system, autonomous functions and learning function, etc.) of the embodiments.

The artificial intelligence apparatus of the embodiments includes the functions of the conventional artificial intelligence, such as an expert system, a limited automaton, a neural network, a relational data base, virtual tables and a programming language for artificial intelligence. Additionally, the artificial intelligence apparatus of the embodiments includes the functions and flexibility which the conventional artificial intelligence does not include, for example, the data driven system, the flexible extension of functions (it is possible to add a function with a local change), the associated memory system, the flexible response for uncertainty, the simulation of multi states, the parallel processing, the system free of defining variables and constants strictly, the searching function based on language, the autonomous processing by conditional sentences, the system free of black boxes, the flexible connections (a feed-forward, a feed-back, many to many connection, etc.), the system free of limitations of differential conditions and a problem regarding convergence in the back-propagation.

The thinking process of the human can be divided in two types. One is a content of the thinking and the other is a process (procedure, processes and way of thinking) of the thinking. In the embodiments, functions are realized by defining the language as a pattern converted from the language as for the content of the thinking, and by setting a method for a process with programs for the process of the thinking (analysis and control of information). There are various types about the contents of thinking. On the other hand, the way of thinking is common, general and multi-purpose. For example, it is possible to define the processes corresponding to the types of sentences (normal sentence, interrogative sentence, imperative sentence, conditional sentence). The reliability and validity of the normal sentence is evaluated, and it is merged into the knowledge system to improve the knowledge system when it is evaluated as safe and valuable. The answer of the interrogative sentence is generated by searching for the appropriate information in the knowledge system. The response of the imperative sentence is determined by considering the past experiences, procedures and the effects when it is conducted (including a consideration whether the effect violates the human rules and moral). The validity of the condition of the conditional sentence is analyzed using the knowledge system and the external information, and the process is performed according to the result of the analysis. By implementing the processes corresponding to the way of thinking (analysis and control of the information) described above as programs, it is possible to realize the system which has the capability to process the various contents of thinking using the accumulated knowledge of language up to now as the language. It is possible to realize the flexible and expandable artificial intelligence with very low cost and efforts. (In the conventional artificial intelligence, it takes very high cost and efforts to realize those functions since it is necessary to program each part corresponding to the contents of thinking.) The memory units of the embodiments have the capability to perform transitions between information (thinking, concepts) by using the relations between the information. The human determines how to change the thinking, when he/she thinks, by using a relation (e.g., cause and effect, phenomenon and reason, explanation and conclusion, abstract and detail, same contents, opposite opinions, etc.), and the artificial intelligence apparatus of the embodiments also uses a relation between the patterns for the transition between information. When information in input, there are many related paths on the information. However, it is possible to transit thinking steps to subsequent appropriate steps according to the way of thinking by selecting an appropriate relation (e.g., cause and effect, phenomenon and reason, explanation and conclusion, abstract and detail, same contents, opposite opinions, etc.) in each thinking step among the related paths.

There are mainly three methods for activating the memory units. A first method is to compare a searching pattern with patterns recorded in the recorder and activates correlated patterns with the analyzer and controller (as for implementing, a method to perform a matching search for the searching pattern and the patterns recorded in the recorder can be used). A second method is to check an activation history during a specified period in a connective information memory area of each memory unit and activate a memory unit which meets a condition for activation (as for implementing, a method to extract a history pattern for a predetermined period from the activation history, compare with patterns recorded in a connection information memory area of each memory unit, and extract the memory unit which satisfies the conditions for activation can be used). A third method is to activate a memory unit having an appropriate relation by using the connective information (numbers of connections, address of the connective units, relation with the connective units) (as for implementing, a method to read the connective information (numbers of connections, address of the connective units, relation with the connective units) recorded in the selected memory unit, extract an appropriate relation as a memory unit for the next step, select a connective memory unit having the appropriate relation, and activate the selected memory unit can be used). The artificial intelligence apparatus of the embodiments uses these methods properly for each process to activate the most appropriate memory unit for the transition of thinking patterns.

The artificial intelligence apparatus of the embodiments has a functions of self-learning. The memory units corresponding to the input information are activated sequentially, and a history of the activations is recorded in the recorder. At each time when the memory unit is activated, a part of the activation history of the activated memory unit (i.e., activation history in a certain period time ahead a time when the memory unit is activated) is recorded in the connective information memory part. Accordingly, a connection between the activated memory unit and a memory unit having a strong relation with the activation is strengthened more and more. When the input information is learning information, a relation between the learning information (logic relations, cause and effect, events in chronological order etc.) is strengthened by inputting the learning information sequentially. After the learning, when information is input, a memory unit of the learning data related to the input information is activated according to the recorded relations sequentially, and contents learned is autonomously activated. And it is possible to activate a plurality of memory units at the same time in each step.

When a series of sentences are inputted, the sentences are converted to patterns and recorded in the memory units. When a relation between the sentences (cause and effect, phenomenon and reason, explanation and conclusion, abstract and detail, same contents, opposite opinions etc.) is recognized, a memory unit corresponding to the relation is activated by the human instruction or automatic setting by learning relations between sentences. That is, when the relation between the sentences is recognized, a memory unit corresponding to the relation is activated, and an activation history between the sentences is recorded in the connective information memory part of the memory unit corresponding to the relation. Accordingly, the connection between the sentences is strengthened more and more. By inputting many sentences, the artificial intelligence apparatus can learn a various types of relations. The artificial intelligence apparatus of the embodiments can learn recognition method about the relations by teaching the relations between sentences by the human (e.g., it is performed by activating a memory unit corresponding to the relation by the human instruction, when the relation is recognized).

The relation between the sentences is used for selecting an appropriate relation in each thinking step among connections between the patters connected in multiple to multiple. A way of transition about thinking patterns differs between a case where the thinking pattern transits to a goal to obtain a final result, and a case where the thinking pattern transits to a cause to obtain a reason why the phenomena occurs. It is possible to narrow the candidates and to control the way of transition by selecting appropriate relation. In the above, it is explained that the relations between the sentences can be recognized by the human instructions or self-learning. The relations which are recognized are recorded in the memory area which records the connective information (number of connections, address of connective unit, relations, etc.) between memory units.

The artificial intelligence apparatus of the embodiments can process the input information by implementing functions to analyze a relation between information, construct the knowledge system, solve problems, and generalize the input information. And it is not necessary to design programs for each case. (The artificial intelligence apparatus may process the input information by designing programs for each case, of course.) The information which is expressed by language, number, numerical expressions and symbols is interpreted and processed according to the each interpretation autonomously. In the conventional system, the processes are expressed by the programs. In contrast, the artificial intelligence apparatus of the embodiments processes the information autonomously by searching the knowledge system for a pattern corresponding to the relational information expressed in the language, comparing with the conditions, and performing a process according to the conditions. Therefore, the artificial intelligence apparatus of the embodiments can process the information by instructing the way of process using language. It is not necessary to design programs for processing the information. The artificial intelligence apparatus can use knowledge which is expressed in language and already constructed by the human as a source of the knowledge system. It is also possible to configure the artificial intelligence apparatus such that a memory unit having programs for each process are defined and when the condition is met, the defined memory unit is activated.

At an initial stage, the human instructs the way of processing of the information to the artificial intelligence apparatus, and it records and learns the ways instructed. The artificial intelligence apparatus performs the processes of the information autonomously after some learning. The human checks an output of the artificial intelligence apparatus. If the output is incorrect, the human indicates to the artificial intelligence apparatus and corrects a false of the output. The learning is performed by indicating the relations between the patterns. The artificial intelligence apparatus of the embodiments forms a connection between the patterns autonomously by indicating relations between the sentences expressed in language.

As above described, while it is necessary to design programs for each case in the conventional system, the artificial intelligence apparatus can set various processes as the pattern corresponding to the language (e.g., words, sentences) and the transition between the patterns, and implement programs regarding the functions to select the way of thinking and a relation between the information. Accordingly, it is possible to reduce efforts and costs for developing the programs. It is also possible to realize all functions of the system, including the function to select the way of thinking and the relation between the information by pattern transitions.

It is possible to recognize the types of sentences (normal sentence, interrogative sentence, imperative sentence, etc.), features of sentences (right and wrong, truth, facts, definitions, rules, common sense, explanations, assumptions, predictions, opinions, impressions), and relations of sentences (cause and effect, phenomenon and reason, explanation and conclusion, abstract and detail, etc.) by converting the language which express the thoughts of humans to patterns and by analyzing the relations between patterns. It is possible to make the artificial intelligence apparatus to learn a recognition of the types and features of sentences as humans do. The types of sentences, such as normal sentence, interrogative sentence, imperative sentence, can be recognized by analyzing the words in the sentences. Among the features of sentences, right and wrong, truth, facts, definitions, rules and common sense are instructed by the human to make the artificial intelligence apparatus recognized learn the same. This is performed by recognizing types of each information (truth, facts, definitions, rules, common sense) when the information is input, and recording the same with additional information. The other types of information (explanations, assumptions, predictions, opinions and impressions) are recognized by analyzing the words in the sentence (e.g., It seems to be . . . , I think . . . , I suppose . . . , etc.), when they are not recorded as right and wrong, truth, facts, definitions, rules and common sense.

The connections between patterns can be expressed as various relations, such as logical relations, definitions, belonging, similarity, action and result, development of reasoning etc. by using the connections between patterns. It is also possible to express relations such as inheritance of features, inheritance of common features and distinction of individual features, etc., flexibly.

By setting relations between the information as connective relations between the patterns, the information is not recorded alone but is recorded as the knowledge system having relations with other information.

There are various relations between information. However, it is possible to control the transitions of patterns properly by selecting appropriate relations between the information (e.g., same meaning, definition, opposite meaning, similarity, logic, cause, effect, detail, abstract, summary, relational information etc.) at the each processing phase (corresponding to each step of the thinking process) of the pattern.

When information is input, meanings of the information are analyzed using the words in the information, and patterns which have the same meanings are generated. These patterns are generated while the subjects, the modifiers of the subject, the predicate, the modifiers of the predicate, and relations of the modifiers of the sentence are maintained. The analysis regarding whether a related pattern exists or not is performed by comparing the generated pattern and the recorded patterns. Since the information is searched in meaning level by using a structure of the sentence, it is possible to detect the patterns having the same and similar meanings even if the words do not match exactly. That is, the artificial intelligence apparatus can perform the search as the associated memory system.

It is possible to evaluate the newness and consistency of the new information by comparing with the recorded information in the knowledge system. There is a high probability that the information is wrong when it is not consistent with the recorded information recognized as the truth, facts, definitions, rules and common sense. On the other hand, when it is difficult to recognize whether the information is consistent or inconsistent, there is a high probability that the knowledge is not accumulated enough to recognize the same. In this case, the artificial intelligence apparatus requires the human for help. The human informs that the information is right when the human judges it to be right. The artificial intelligence apparatus records the information as the explanation or assumption, and evaluates the information as reliable information when the consistency and validity is confirmed by the combinations of truth, facts, definitions, rules and common sense in the future.

When the information is constructed in the knowledge system, it is possible to solve problems with the knowledge system. Firstly, a point of the problem is clarified and a goal to the problem is set by analyzing the problem by using the knowledge system. The methods to solve the problem are extracted and applied to the problem. The situation after the application is evaluated and the process is terminated when the goal is accomplished. On the other hand, when the goal is not accomplished, the processes are continued and applying to a new situation to be closer to the goal. The problems are recognized by analyzing the patterns corresponding to the situations, and the patterns needed to solve the problems are activated to execute the processing. The situations change by the processing, and the problem is solved by applying the same process to the changed situations.

The analysis of the problem and recognition of the point of the problem is performed by learning methods of detecting and recognizing a differences between a situation of a goal and a current situation. A method to solve the problems is also obtained by learning processing to cope with the problems. The learning is performed by recording a history of pattern transitions. The contents taught by the human are recorded as the transitions from a pattern to a pattern. As the learning proceeds, the processes are performed automatically as a transition from a pattern to a pattern, and the contents taught by the human are performed.

A transition of the thinking pattern of the human can be expressed with the conditional process, because the transition of the thinking pattern changes according to a condition. The artificial intelligence apparatus of the embodiments confirms the validity of the conditions autonomously when it detects the conditional processes. The artificial intelligence apparatus checks whether the detected information satisfies the condition and executes the corresponding processes when the condition is satisfied. When a method to solve the problem which the human usually uses is input in language, the artificial intelligence apparatus proceeds the conditional process by interpreting a meaning and selecting the conditional branches to solve the problem. When new information is needed during the process, a request for the information is made. When appropriate information is obtained, a process corresponding to the information is executed.

At the learning phase, when one pattern is activated, a history of patterns activated before the one pattern is activated is referred, and connective relation with the one pattern is strengthened. At the phase of practical use, it is judged that whether activation conditions recorded in each memory unit satisfy by using recorded activation history, and if the activation condition satisfies, a corresponding pattern is activated. When the pattern is activated, the activation history is updated. This operation is repeated for each new situation, and patterns satisfying the activation condition activate.

At the learning phase, a series of the patterns are activated by the human instructions, and the history of the activations are recorded. Accordingly, corresponding pattern is activated according to the instructed procedure. The operation of the pattern is not static, but is dynamic and has functions of the program. It is possible to search for the information using the patterns which are included in the patterns, to execute processing using the information searched, and to record the results of the processing at the appropriate memory area. It is possible to arrange the internal patterns into the specified area. It is also possible to activate various programs using an activation of the pattern as a trigger. (It is also possible to obtain a result by activating a usual program.) It is possible to perform various processes (numerical processing, chemical formula processing, translation etc.) by combining these dynamical functions of patterns.

The operations of the artificial intelligence apparatus of the embodiments is controlled by a controller. An input of the information, analysis of the information (types of the sentences, sentence structures, meanings, etc.), evaluation of the information (newness, reliability, validity, usability, etc.), processing of the information (generating of a solutions for a problem, recording, output of the information, etc.) are performed at a transition cycle of each pattern.

It is possible to instruct to the artificial intelligence apparatus by inputting language without programming. (It is possible to instruct using programming, of course.) The sentence structures, meanings of the sentences, relations between the recorded information of the input information are analyzed, and a pattern corresponding to a result is activated, and a process is executed. It is possible to perform various processes, such as evaluation and recording of the information, execution of the specified order, generation of solutions for various problems, methods for solving problems, conversations, etc.

At the programming, reading of variables and constants, processing, writing of a result, processing using conditional branches are performed according to programming language. On the hand, the artificial intelligence apparatus of the embodiments analyzes and recognizes the input information (language), and performs a searching for the related information, transitions between the related information (i.e., transition of patterns), conditional branches, processing of the information (i.e., processing of the pattern) and recording of the generated information (i.e., recording of the pattern) based on a result of the analysis and the recognition. By these operations, the artificial intelligence apparatus of the embodiments can perform various processes based on the language like programming. (It is also possible to perform repeated processing.) Of course, the artificial intelligence apparatus of the embodiments can perform processes defined by the general programming.

The artificial intelligence apparatus has a capability, other than to process according to the general programming, to accumulate the information input in language by analyzing and interpreting the information. The artificial intelligence apparatus solves the problem by performing a transition of the patterns which simulates a thinking pattern of the human by using patterns (arranged for easy searching) in the knowledge system.

The artificial intelligence apparatus of the embodiments also has the capability to understand the human language and execute programs. Therefore, the artificial intelligence apparatus of the embodiments can construct an advanced system which executes the programs which the human has developed up to now, and report results of the programs to the human while communicating with the human.

Generalization of the input information is explained below.

The generalization is performed by extracting features and higher level concepts from the words included in the sentence of the input information. For example, proper nouns which appear in the sentences are generalized as a person A, a person B, an object C and an object D, etc. The sentences are converted to patterns and activated. At the same time, the generalized patterns which are higher level concepts of the input information are also activated. By inputting many sentences, the connective relations between the patterns which construct the sentences are strengthened. The sentences have some relations with the near sentences. Since the relation is expressed as the relation between the words in the sentence, the words having the same or similar meanings appear in the sentences having the same relations. The patterns of words are activated when the sentences which include the words are activated. By generalizing the proper nouns, the connective relations between the generalized humans and things are strengthened, and a frequency of appearance of the same sentence is larger than that of the proper nouns. As a result, the relations which are independent of the proper nouns are extracted. By activating meanings and features of the words, the relations between the features corresponding to the words are strengthened. Accordingly, generalization in the features can be performed. This relations can be detected since the connective relations between specific patterns are strengthened. Especially, the relations which are strengthened using many sentences have a generality, and the common sense or thoughts which are general are extracted. The general thoughts or common sense depend on the input sentences. Specifically, if the sentences corresponding to one culture are input, the common sense or general thoughts corresponding to the one culture is extracted. When the sentences corresponding to the same culture are input, it is assumed that the way of thinking is the same, the way of thinking which is strengthened by many sentences in the same culture is extracted.

Similarly, it is possible to extract a relation generalized for the problems and solutions by extracting features of words for the problem and solutions and generalizing them. When the learning proceeds by inputting information, the artificial intelligence apparatus of the embodiments can generate a solution to a similar problem autonomously.

Hereinafter, operations of the artificial intelligence apparatus that classifies input information to a conditional part and a processing part, arranges in a sentence structure, and records the same in the recorder are explained. The artificial intelligence apparatus can recognize the conditional part and the processing part by analyzing words in the information. For example, if a sentence 'Do C, if A is B' is input, 'if A is B' is classified as the conditional part, and 'Do C' is classified as the processing part. If a sentence 'C is D, if A is B' is input, 'if A is B' is classified as the conditional part and 'C is D' is classified as the processing part.

After the sentences are classified to the conditional parts and processing parts and when the patterns which corresponds to conditional parts are activated, the processes to check the validity of the conditional parts are activated autonomously. It is possible to realize an active thinking operation which proceed the processes by checking the validity of the conditions. Generally, the processes of solving problems and deciding actions by the human are expressed by the conditional processes. The artificial intelligence apparatus can perform the active thinking operation in which the processes of solving problems and deciding actions by the humans being input by the language are converted into the conditional processes, and the process proceeds while checking whether the condition is satisfied. It is possible to perform solving problems and deciding actions autonomously as the humans do, by inputting the knowledge expressed by the language (e.g., procedures and a way of thinking regarding the solving problems and deciding actions) without programming operations corresponding to the solving problems and deciding actions of the humans.

EMBODIMENTS OF THE INVENTION

FIG. 1 illustrates a functional block diagram of an artificial intelligence apparatus of the embodiments. Reference numeral 1 denotes the input processor which converts the information (words, language, sentences, knowledge, numerical expressions, symbols, image, sound) to patterns. Reference numeral 2 denotes an analyzer which analyzes words, meanings, sentence elements (subjects, predicates, modifiers of subjects, modifiers of predicates, relations of modifiers), fields, reliability, newness, validity, comparison with recoded information, types of sentences, intentions, relations between sentences for the input information. Reference numeral 3 denotes a recorder which records the information (word, words, parts of speech, meanings, truth, facts, common sense, rules, morals, fields, objects of interest, logics, special knowledge), types of problems, methods of solving problems, procedures, thoughts, ideas, context, results of the analysis, connective relations between information, relations between information, conditions to activate information and programs, history of the activated information and programs. Reference numeral 4 denotes a controller which executes, autonomously or in response to instructions by the human, development of processes which correspond to the types of sentences and intentions (question, order, request, action for conditional sentences, extraction of valuable information and recording, conversation, prediction, estimate), logic development for solutions, execution of the processes, activation of the processes and programs, generalization of the information and procedures, update to better knowledge and procedures, search and arrangement about interested fields and objects, registration and change of patterns, connective relations and relations, transition control for the target. Reference numeral 5 denotes an output processor which converts patterns to information and control signals.

Next, operations of the artificial intelligence apparatus are explained.

Firstly, information is converted into a pattern. There is no restriction about a method to convert words, numbers and symbols into patterns, as long as they are recognized each other. The combinations of patterns are also patterns. In the prototype of the artificial intelligence apparatus of the embodiments, identifying numbers are associated to each word. (For example, the identifying number of 'I' is '0', similarly, the identifying number of 'ha' is '1', 'teacher' is '2', . . . 'artificial intelligence' is '169', 'occupation' is '170', . . . etc.) It is possible to cope with new words by adding the identifying numbers as needed. It is possible to express various thoughts and concepts by the combinations of patterns (in the embodiments, combinations of identifying numbers corresponding to words and symbols are arranged to structures of subject, predicate and modification relation).

The memory units for detecting words are activated when series of the words corresponding to the information (sentences) are input. A type of the series of the words to identify the word is recorded in the connective information memory part of the memory unit corresponding to each word. A history of the series of the words corresponding to the series of the words of the word is detected, the memory unit of the corresponding word is activated. The memory unit has a connective relation with a memory unit recording meanings, parts of speech, corresponding foreign language of the words and they are used for the analysis of sentence structures. The subject, the predicate and modifiers (what, when, where, why, how) of the analyzed sentence are recognized, arranged for searching and recorded in the memory units of the recorder. It is possible to search the sentence elements (what, when, where, why, how) easily, because they are arranged in that order with remaining the structure of the sentence. FIG. 4 illustrates functions that recognize words, meanings and sentence elements using a series of words. The words are recognized using the series of words, and sentence elements are recognized using the parts of speech and meanings which are activated at the same time corresponding to the activation of the words. The subjects, modifiers of the subject, predicate, modifiers of the predicate (what, when, where, why, how) are recognized by analyzing the sentence elements and recorded in the recorder. It is very effective to record the information arranging as above explained. Since the input information is compared with the recorded information on a sentence elements base, it is possible to detect newness and to analyze differences with the recorded information exactly and easily.

The artificial intelligence apparatus of the embodiments has the capability to represent the thoughts and information of the human by patterns and to make transitions between the patterns autonomously. FIG. 2 shows functions of the memory units which enable autonomous transitions. The memory units record various contents related to the information. Examples of the contents are: patterns which express information; connective information with the other memory units which express relations between information (number of connections, address of the connective units, relation with the connective units); conditions to activate memory units (verification condition, matching condition); and results of analysis about patterns (sources of the information, reliability, newness, fields, themes, types of sentences), etc. The types of sentences (normal sentence, interrogative sentence, imperative sentence, conditional sentence, exclamatory sentence, truth, facts, rules, common sense, definitions, logics, explanations, assumptions, predictions, opinions, impressions, rumors), conversion from relative words to absolute words, numerical expressions, chemical formulas and symbols are recognized and recorded as the results of analysis. The subjects, modifiers of the subject, the predicate, modifiers of the predicate, relations of modifying, types of sentences, numerical expressions, physical expressions, chemical expressions, symbols, when, where, who, what, how, why, and/or the relations of the recorded information of the pattern are analyzed, arranged in the structures which enable easy searching and recorded. When the information is input, the fields, themes, types of sentences, sentence structures (subject, modifiers of the subject, predicate, modifiers of the predicate, relations of modifying), types of sentences, numerical expressions, physical expressions, chemical expressions, symbols, when, where, who, what, how, why) are analyzed, and the values (reliability, newness, validity, consistency, right and wrong, relations with recorded information) of the information are evaluated by comparing with the recorded information. The information which are evaluated as valuable and safe is recorded according to the fields, themes and relations with recorded information.

FIG. 3 illustrates an example of evaluation of the input information.

At a first stage, the analysis about the reliability of the information is performed. This analysis is performed by analyzing the reliability of source of the information (when, from whom, form which the information is obtained).

At a second stage, fields/themes of the information are analyzed. This analysis is performed by analyzing words included in the information.

At a third stage, a type of the information is analyzed. Among the types, the truth, facts, definitions, rules, common sense, right and wrong are determined by the human instructions. The explanations, assumptions, predictions, opinions, impressions are recognized by detecting the words (It seems, I think, It is said, etc.) in the information. It is also possible to recognize the types of the sentences, such as normal sentence, interrogative sentence, imperative sentence, conditional sentence, exclamatory sentence by detecting the words in the information.

At a fourth stage, degree of interest is evaluated. This evaluation is performed by registering the fields/themes being in interested beforehand, and comparing the registered fields/themes with the analyzed fields/themes of the information.

At a fifth stage, newness of the information is evaluated. This evaluation is performed by searching a memory area for the input information and patterns semantically equivalent to the input information to detect a relational pattern. If the relational pattern is detected, differences between the patterns are compared in order to check the new pattern.

At the sixth stage, the validity of the information is evaluated. This evaluation is performed by searching the memory area which defines a relation between the words for patterns of the input information and the relational information, and by checking the consistency of the sentence elements. When inconsistency is detected, the reliability (truth, facts, definitions, rules, common sense, right and wrong, reliability of the sources) of the input information and the relational information is evaluated, and the information which is evaluated more reliable is selected and recorded. The information which is inconsistent with the rules, common sense and morals is rejected without including in the knowledge system of the artificial intelligence apparatus.

FIGS. 5 to 9 illustrate functions which evaluate the input information. The analysis shown in FIG. 3 is performed, and the information which is evaluated as valuable and safe is arranged to the structure for easy searching and recorded in the recorder with the result of the analysis.

FIG. 10 illustrates functions that analyzes relations between sentences and records them in the recorder. There are various relations between information, such as, cause and effect, phenomenon and reason, explanations and conclusions, abstract and details, similar meanings, opposite opinions, body and summary, body and details etc. The setting of these relations are performed by the human instructions or automatic setting which is realized by learning relations between information. The information is recorded as knowledge which has relations to each other. Therefore, when information is input and a corresponding memory unit is activated, information of relational units (destination, relations) is detected from the activated memory unit, and an appropriate unit is activated to search the necessary information.

FIGS. 11-22 illustrate functions of the controller.

FIG. 11 illustrates functions which analyze types of the sentences and execute processing according to the types. FIG. 12 illustrates functions which respond to imperative sentences and request sentences. The function analyzes input sentences and executes processing according to a results of the analysis.

FIG. 13 illustrates a function which respond to interrogative sentences. Since a part responding to a question is missing, a pattern [*] is assigned at the missing part. Then, it is possible to generate a searching pattern corresponding to the question by combining the patterns which correspond to the rest of the interrogative sentence. A sentence element (subject, modifiers of subject, predicate, modifiers of predicate) expected as an answer to the question is set as the searching pattern. This is recognized from a location of the sentence element of the pattern [*]. For example, a pattern corresponding to [when] is [*]H1, a pattern corresponding to [where] is [*]H2, a pattern corresponding to [why] is [*]H3, a pattern corresponding to [how] is [*]H4, a pattern corresponding to [who] is [*]S, a pattern corresponding to [what] is [*]O and a pattern corresponding to [do] is [*]V. The searching pattern generated from the question is searched in the recorder to detect a pattern having correlations with the searching pattern. A candidate of an answer is detected from the patterns searched when the pattern exists at a location corresponding to the pattern [*]. The information is arranged according the sentence elements, and it is possible to compare each elements. It is possible to select various types of comparison, for example, complete matching, partial matching, similar matching, opposite matching etc. It is possible to set the relations of same meaning, similar meanings, opposite meaning etc. to the words in the memory modules. It is possible to extract the various relations by comparing the input information and the recorded information using the words which have relations.

FIG. 14 illustrates a function which responds to conditional sentences. It is possible to realize the active thinking processes which proceed the processes expressed by the conditional sentences by checking the validity of the conditions. Generally, methods to solve problems and to decide actions of the human are expressed by the conditional processing. By inputting the methods to solve problems and to decide actions of the human expressed in language, the artificial intelligence apparatus can perform the active thinking processes in which the validity of the conditions and proceeding to the following steps are checked autonomously. By inputting the knowledge (procedures and methods to solve problems and to decide actions) which is expressed in language, it is possible to solve problems and to decide actions autonomously as the humans do with thinking, without programming.

FIG. 15 illustrates functions that extract and record valuable information. The reliability, newness, validity and interest of the input information is evaluated. Then, the input information evaluated as valuable is arranged for easy searching and recorded in the recorder by adding the results about the types of the information, fields, themes and interest.

FIG. 16 illustrates a function that generates conversations. The types, interest and intentions of the speaker's input sentences are analyzed. This analysis is performed by detecting characteristic patterns (combinations of words) in the input sentences. Then, programs (which execute greetings, collect information about counterparts, evaluate conversations, search information for the conversations, generate answers to problems and questions, activate a program to solve problems, ask to the counterparts) are activated to generate the conversations (output). It is possible to generate daily conversations as humans do by an information search using a word in the conversation as a search key and an information search using a relation between the information in the programs.

FIG. 17 illustrates functions that develop logic, execute processing and activate programs to solve problems. It is possible to solve problems step by step by detecting problems from situations and applying procedures corresponding to the detected problems. FIG. 18 illustrates an operation of the embodiments using pattern transitions. At a first stage, the problems are analyzed using the knowledge system, important points of the problems are clarified and a goal for the problem is set. At the second stage, the procedures to solve the problems are extracted and applied. The situations after applying the procedures are evaluated, and the process terminates when the goal is accomplished. If the goal is not accomplished, the above procedures are applied to the new situation to be closer to the goal.

It is possible to construct a high level conversation system if a solving programs which autonomously detect and solve a problem are activated autonomously. When the speaker's conversation is input, types of the sentences, intentions and interest of the speakers are analyzed. The programs corresponding to the results of the analysis are activated and the processing necessary to perform conversations is executed. For example, the programs include greetings, gathering information of the speakers, evaluation about the conversations, searching information for the conversations, generating answers to the questions and problems, programs to solve problems, questions to the speakers. The information is searched using associative words and relations between information to cope with the various conversations. The new knowledge which is obtained through conversations is recorded in the recorder and the knowledge can be expanded.

FIG. 19 and FIG. 20 illustrate functions that generalize information and procedures. When the information is input, a generalized pattern (corresponding to the generalized information) is activated at the same time. According to this, a relation between generalized words is strengthened. The examples of the generalized words are words which express high level concepts, meanings and features of the words. It is possible to extract the common sense and generalized thoughts by inputting many sentences and strengthening the relations between generalized words.

FIG. 21 illustrates a function that updates to better logics and knowledge. A value of the input information about a certain theme is evaluated, and the valuable information is compared with the recorded relational information. When the input information is valuable (i.e., new, reliable, detail development of logics, based on reliable resources etc.), a priority of connection with the relational information in the knowledge system is set to be higher than that of the recorded relational information, and recorded. It is possible to access the best information which is recorded in the knowledge system in the recorder by evaluating every input information about the theme, setting and recording a validity and a priority for the access. The information of which priority becomes very low may be deleted periodically.

FIG. 22 illustrates functions that arrange and search for information about interesting themes and fields. The artificial intelligence apparatus of the embodiments collects information periodically about the interesting themes and fields which are registered beforehand using the internet, etc. The artificial intelligence apparatus collects the associative information using key words of the interesting themes and fields. The information which is searched is evaluated by the knowledge system and safe and valuable information is extracted and included in the knowledge system. The artificial intelligence apparatus of the embodiments learns about the truth, facts, common sense, rules and morals before connecting to the internet, and detects the information which is inconsistent to the human morals and rules so as not to include in the knowledge system. The artificial intelligence apparatus expands the knowledge by evaluating consistency, validity and soundness of the input information, without accepting the input information directly.

The operations of the artificial intelligence are shown below. It is shown that the system talks and solves various problems by using the knowledge given by the human. The information to solve problems is given beforehand by the human. The artificial intelligence apparatus copes with the conversations and questions using the knowledge. In each conversation, the artificial intelligence apparatus detects a characteristic pattern, activates programs needed to understand, identifies and solves the problems autonomously, records the newly generated information in the pattern recorder as a knowledge to expand the knowledge. Details of the processing are shown in (Process 1) to (Process 20). No. (number of the conversations): Conversations between human and the artificial intelligence apparatus 1 Human: How do you do?
2 AI: I am ATOM (Process 1)
3 I am an artificial intelligence.
4 Human: I am Taro.
5 AI: My occupation is an assistant. (Process 2)
6 What is Mr. Taro's occupation?
7 Human: My occupation is a teacher.
8 AI: A teacher is one of the severe occupations, aren't it? (Process 3)
9 Human: I teach physics in a class.
10 I instruct tennis after school.
11 AI: What is Mr. Taro's hobby? (Process 4)
12 Human: My hobby is sports.
13 AI: Speaking of sports, (Process 5)
14 Kei won the tennis cup yesterday.
15 He won without losing game at the final game.
16 He is wonderful.
17 Human: Why is your occupation an assistant?

18 AI: I want to be helpful for everyone. (Process 6)
19 Human: Explain about the assistant in detail.
20 AI: I help to solve problems. (Process 7)
21 I can cope with daily problems.
22 I can cope with physical problems.
23 I can cope with mathematical problems.
24 I can be an advisor.
25 Human: Then answer the following questions.
26 AI: Yes. (Process 8)
27 Human: This is a problem about daily life.
28 Human: Tell me about the restaurants.
29 Human: Which restaurants have the price range below 8000 yen?
30 AI: The price range of Restaurant A, Restaurant B, Restaurant C and Restaurant E is below 8000 yen. (Process 9)
31 Human: Which restaurants, in addition, have the distance below 1 km?
32 AI: The distance to Restaurant A, Restaurant C and Restaurant E is below 1 km. (Process 10)
33 Human: Which restaurants, in addition, have recommendation of sake?
34 AI: The recommendation of Restaurant C and Restaurant E is sake. (Process 11)
35 Human: This is a problem about daily life.
36 Human: The price of three apples is 300 yen.
37 Human: What is the price of five apples?
38 AI: The price of five apples is 500 yen. (Process 12)
39 Human: This is a problem about mathematics.
40 Human: x0 is 4.
41 Human: x1 is 5.
42 Human: [2 d2x/_dtdt+3 d_x/_dt+1=0]
43 AI: The solution of the equation is shown below. (Process 13)
   x=Aexp(p1t)+Bexp(P2t)
   p1=−1, p2=−0.5
   A=−14, B=18
44 Human: This is a problem about mathematics.
45 Human: [f=x **2+2 x−4]
46 Human: [g=2 x]
47 Human: What are the cross points of f and g?
48 AI: The cross points of f and g are −2 and 2. (Process 14)
49 Human: What is area surrounded by f and g?
50 AI: The area surrounded by f and g is 10.6667. (Process 15)
51 Human: This is a problem about physics.
52 Human: The initial velocity of the ball is v.
53 Human: The elevation angle of the ball is t.
54 Human: v is 10 m/s.
55 Human: t is 45 deg.
56 Human: What is the flying distance of the ball?
57 AI: The flying distance of the ball is 10.2041 m. (Process 16)
58 Human: This is a problem about physics.
59 Human: The force of the spring is −kx.
60 Human: The force of the damper is −d dx/dt.
61 Human: The force of the gravity is +m_g.
62 Human: The force of the spring acts on bodyC.
63 Human: The force of the damper acts on bodyC.
64 Human: The force of the gravity acts on bodyC.
65 Human: What act on bodyC?
66 AI: The force of the spring, the force of the damper, and the force of the gravity act on bodyC. (Process 17)
67 Human: g is 9.8.
68 Human: m is 1.0.
69 Human: k is 1.0.
70 Human: d is 1.0.
71 Human: What is the equation of motion?
72 AI: The equation of motion is as follows. (Process 18)
   g=9.8
   m=1.0
   k=1.0
   d=1.0
   d2x/_dtdt+(d/m_)d_x/_dt+(k/m_)x=g
73 Human: This is a problem about physics.
74 Human: The shape of the body D is cube.
75 Human: The side length of the body D is d.
76 Human: d is 2.
77 Human: The weight of the body D is 4.
78 Human: What is the specific gravity of the body D?
79 AI: The specific gravity of the body D is 0.5. (Process 19)
80 Human: If the specific gravity of body D is below 1, [conditional part]
81 Human: the body D floats. [processing part]
82 AI: The body D floats. (Process 20)

—Processing of the Artificial Intelligence Apparatus (Detail)—
(Process 1)—
(1) Extraction of Relational Information
   Process: Detect greeting (How do you do?).
   Process: Activate programs to gather information(name, occupation) of a speaker.
   Process: The name of the speaker has not been recorded.
(2) AI (Output)
   I am ATOM.
   I am an artificial intelligence.
(Process 2)—
(1) Extraction of Relational Information
   Process: Detect information (name) of the speaker.
   Process: Name is Taro.
   Process: Name has been recorded.
   Process: Occupation has not been recorded.
(2) AI (Output)
   My occupation is an assistant.
   What is Mr. Taro's occupation?
(Process 3)—
(1) Extraction of Relational Information
   Process: Name of the speaker is recorded.
   Process: Name is Taro.
   Process: Detect occupation of the speaker.
   Process: Occupation is a teacher.
   Process: Search and output opinions about a teacher.
(2) AI (output)
   A teacher is one of the severe occupations, aren't it?
(Process 4)—
(1) Extraction of Relational information
   Process: Activate programs which gather information (hobby) of the speaker.
   Process: Hobby has not been recorded.
(2) AI (Output)
   What is Mr. Taro's hobby?
(Process 5)—
(1) Extraction of Relational information
   Process: Detect hobby of the speaker.
   Process: Hobby is sports.
   Process: Search and output news about sports.
   Process: Analyze the searched news. Detect "won without losing game."
   Process: Evaluate the searched news. Detect "He is wonderful" for "won without losing game."
   Process: Search and output the evaluation, opinions about detected.

(2) AI (Output)
Speaking of sports,
Kei won the tennis cup yesterday.
He won without losing game at the final game.
He is wonderful.
(Process 6)—
(1) Extraction of Relational Information
Process: Set qqtype=6; // Type of questions (Why)
Process: Detect connections (The number of the connections is 6).
senconrel[i][j]=1
senconrel[i][j]=1
senconrel[i][j]=1
senconrel[i][j]=1
senconrel[i][j]=1
senconrel[i][j]=5
Process: Detect connections (Reason).
Process: The address of the connective unit (Reason)=28
Process: Output a sentence (Reason): I want to be helpful for everyone.
(2) AI (Output)
I want to be helpful for everyone.
(Process 7)—
—Example of Access for the Relational Information Using a Connection Between Sentences—
Display of a standard sentence: My occupation is an assistant.
The number of sentences related to the standard sentence is 6.
1 I help to solve problems.
(Relation is 'detail')
2 I can cope with daily problems.
(Relation is 'detail')
3 I can cope with physical problems.
(Relation is 'detail')
4 I can cope with mathematical problems.
(Relation is 'detail')
5 I can be an advisor.
(Relation is 'detail')
6 I want to be helpful for everyone.
(Relation is 'reason')
(Process 8)—
(1) Extraction of Relational Information
Process: Detect answer (the questions, problems).
(2) AI (Output)
Yes.
(Process 9)—
(1) Extraction of Relational Information
Detect (Whichis) problem.
Information extracted from related memory units to solve the problem.

| No.     | 1    | 2    | 3    | 4     | 5    |
|---------|------|------|------|-------|------|
| Unit No | 10   | 11   | 12   | 13    | 14   |
| Value   | 4000 | 6000 | 8000 | 10000 | 5000 |

Output Unit No which satisfy the condition.

| Unit No = | 10 | 11 | 12 | 14 |
|---|---|---|---|---|

Answer: The price range of Restaurant A, Restaurant B, Restaurant C, Restaurant E is below 8000 yen.

(2) AI (Output)
The price range of Restaurant A, Restaurant B, Restaurant C, Restaurant E is below 8000 yen.
(Process 10)—
(1) Extraction of Relational Information
Detect problem for selecting from the recorded information.
Detect (Whichis) problem.
Information extracted from related memory units to solve the problem.

| No.     | 1   | 2   | 3   | 4   |
|---------|-----|-----|-----|-----|
| Unit No | 5   | 6   | 7   | 9   |
| Value   | 0.5 | 1.2 | 0.8 | 0.3 |

Output Unit No which satisfy the condition.

| Unit No | 5 | 7 | 9 |
|---|---|---|---|

Answer: The distance of Restaurant A, Restaurant C, Restaurant E is below 1 km.
(2) AI (Output)
The distance to Restaurant A, Restaurant C, Restaurant E is below 1 km.
(Process 11)—
(1) Extraction of Relational Information
Detect (Whichis) problem.
Information extracted from related memory units to solve the problem.

| No.     | 1 | 2 | 3 |
|---------|---|---|---|
| Unit No | 5 | 7 | 9 |

Output Word No which satisfy the condition.
Word No. for Answer
Word No. 55, recommendation of Restaurant C
Word No. 57, recommendation of Restaurant E
Answer: The recommendation of Restaurant C, Restaurant E is sake.
(2) AI (Output)
The recommendation of Restaurant C, Restaurant E is sake.
(Process 12)—
(1) Extraction of Relational Information
There is no information related to the question.
Process: Detect problem about the price.
Process: Activate programs which get price.
Process: Detect relational information about the price.
Process: unit price=100
Process: total price=500
(2) AI (Output)
The price of five apples is 500 yen.
(Process 13)—
(1) Extraction of Relational information
2-coefficient=2
1-coefficient=3
0-coefficient=1
Process: Activate programs to solve differential equations.
Get solution of A $d2x/\_dtdt + B\ d\_x/\_dt + C = 0$
$d\_x/\_dt(0) = x1, x(0) = x0$
A=2, B=3, C=1
x1=5 x0=4

(2) AI (Output)
  The solution of the equation is shown below.
  x=A exp(p1t)+B exp(p2t)
  p1=−1 p2=−0.5
  A=−14 B=18
(Process 14)—
(1) Extraction of Relational Information
  There is no information related to the question.
  Process: Detect problem about cross points.
  Process: Activate searching function 1.
  Process: Detect function 1=f.
  Process: Display Coefficients C2=1, C1=2, C0=−4.
  Process: Activate searching about function 2.
  Process: Detect function 2=g.
  Process: Display Coefficients C2=0, C1=2, C0=0.
  Process: Display Coefficients (2−1) C2=−1, C1=0, C0=4.
  Process: Detect cross points.
  Process: x1=−2, x2=2
  Answer: The cross points x1=−2, x2=2.
(2) AI (Output)
  The cross points of f and g are −2 and 2.
(Process 15)—
(1) Extraction of Relational Information
  There is no information related to the question.
  Process: Detect problem about cross points.
  Process: Activate searching about function 1.
  Process: Detect function 1=f.
  Process: Display Coefficients C2=1, C1=2, C0=−4.
  Process: Activate searching about function 2.
  Process: Detect function 2=g.
  Process: Display Coefficients C2=0, C1=2, C0=0.
  Process: Display Coefficients (2−1) C2=−1, C1=0, C0=4.
  Process: Detect cross points.
  Process: x1=−2, x2=2
  Process: Display Coefficients Integral(2−1) C3=−0.333333, C2=0, C1=4.
  Process: Integral(2−1)[x1−x2]=10.6667
  Answer: Area=10.6667
(2) AI (Output)
  The area surrounded by f and g is 10.6667.
(Process 16)—
(1) Extraction of Relational Information
  There is no information related to the question.
  Process: Detect problem about flying distance.
  Process: Activate programs to obtain flying distance.
  Process: Searching for initial velocity.
  Process: Searching for elevation angle.
  Process: Detect initial velocity. v=10 m/s
  Process: Detect elevation angle. t=45 deg
  Process: Derive flying distance (formula). v*v*sin 2*t/g
  Process: Derive flying distance (value). 10.2041 m
  Answer: The flying distance is 10.2041 m.
(2) AI (Output)
  The flying distance is 10.2041 m.
(Process 17)—
(1) Extraction of Relational Information
  Detect (Whatis) problem.
  Information extracted from related memory units to solve the problem.

| No. | 1 | 2 | 3 |
|---|---|---|---|
| Unit No | 71 | 72 | 73 |
| Type of Right term | 3 | 4 | 5 |
| Right term[3] | − | − | + |
| Right term[2] | k | d | m_ |
| Right term[1] | x | x | g |

Answer: The force of the spring, the force of the damper, and the force of the gravity act.
(2) AI (Output)
  The force of the spring, the force of the damper, and the force of the gravity act. (Remarks) Definition of type of term
  0: No data, 1: symbol, 2: ±symbol, 3: ±symbol·x, 4: ±symbol·d_x/_dt, 5: ±symbol·symbol, 6: ±d2x/_dtdt
(Process 18)—
(1) Extraction of Relational Information
  Display in type number and symbol.

| Type of Left term | 6 | 0 | 0 |
|---|---|---|---|
| Left term[1] | + | | |
| Left term[2] | m_ | | |
| Left term[3] | x | | |
| Left term[4] | / | | |
| Left term[5] | 1 | | |
| Type of Right term | 3 | 4 | 5 |
| Right term[1] | − | − | + |
| Right term[2] | k | d | m_ |
| Right term[3] | x | x | g |
| Right term[4] | / | / | / |
| Right term[5] | 1 | 1 | 1 |

(The rest is omitted)
(2) AI (Output)
  The equation of motion is as follows.
  g=9.8
  m=1
  k=1
  d=1
  d2x/_dtdt+(d/m_)d_x/_dt+(k/m_)x=g
(Process 19)—
(1) Extraction of Relational Information
  There is no information related to the question.
  Process: Detect problem about the specific gravity.
  Process: Activate programs to obtain specific gravity.
  Process: Activate programs to obtain the volume.
  Process: Searching for the information about the shape.
  Process: Detect the shape data.
  Process: Detect the shape data (cube).
  Process: Detect the side length=2.
  Process: Volume(formula)=d**3
  Process: Volume(value)=8
  Process: Detect information about the weight=4.
  Process: Specific gravity (Value)=0.5
(2) AI (Output)
  The specific gravity of the body D is 0.5.
(Process 20)—
(1) Extraction of Relational Information
  Process: Detect that the condition is satisfied.
  Process: Output the process when the condition is satisfied.

| 105 | The body D |
| 1 | |
| 111 | floats |
| 5 | . |

(2) AI (Output)

The body D floats.

The above operations of the artificial intelligence apparatus are explained below.

The conversation No. 1 shows a conversation of the artificial intelligence apparatus for greetings when it meets a speaker at the first time. The detailed processes of generating the conversations are shown at (Process 1). In Process 1, the sentence 'How do you do?' is detected, and a program which gather the information about the speakers (names, occupations) is activated. And the sentences 'I am ATOM' and 'I am an artificial intelligence' which introduce itself are output.

Then the artificial intelligence apparatus detects that the name of the speaker is 'Taro' from the conversations. Since the information about the occupation of the speaker has not been obtained, the conversations 'My occupation is an assistant' and 'What is Mr. Taro's occupation?' are output to gather the information thereof. (Process 2)

As the artificial intelligence apparatus got and recorded the information that the name of the speaker is 'Taro', it uses 'Mr. Taro' to call the speaker. The conversation No. 7 shows an operation to gather the information about the occupation of the speaker and generate the conversations corresponding to it. The knowledge that the occupation is a teacher is already got from the conversations of the speaker. An opinion of the artificial intelligence apparatus according to a teacher is searched and output. (Process 3)

At the conversation No. 11, a program to gather the information about the hobby is activated, as the information about the name and occupation is already obtained. The (Process 5) shows the operation that searches news, topics and themes about the sports in the knowledge system, since the information that the hobby of the speaker is sports is obtained. The conversation 'Speaking of sports' is generated relating to the sports, as the news about the tennis player which the artificial intelligence apparatus is interested in is recorded. It is possible to generate conversations which are based on the associative information. Furthermore, the characteristic words 'won without losing game' are detected, and the evaluation of them that 'He is wonderful' is searched and output as the opinions about the news. It is possible to generate detailed conversations using the relations between the information recorded in the knowledge system.

The conversation No. 17 shows the question why the occupation of the artificial intelligence apparatus is an assistant. The (Process 6) shows the operation to generate the answer to the question. The artificial intelligence apparatus searches the information relating to the assistant which is the occupation thereof. The (Process 7) shows the operation that the artificial intelligence apparatus records the information relating to the recorded information in the knowledge system. In an example of the (Process 7), the number of sentences related to the standard sentence "My occupation is an assistant", an address of the connective unit of the related sentences, and relations between the standard sentence and the related sentences are recorded, and it is possible to search the related sentences using the relations based on the standard sentence. There are six related sentences which have relations with the standard sentence at the example of (Process 7), and five sentences have the relations of detail and 1 sentence has the relation of reason. One of the related sentences which has the relation of reason is selected, because the question is why the occupation is an assistant. In this example, one sentence has the relation of reason, and the selected result that 'I want to be helpful for everyone' is output. There are another searching methods. Since the structures of the sentences are analyzed and arranged according to the 5W1H, it is possible to search the information about the reason using the searching pattern [H3] [H4] ([H3: Why] is searching information, [H4: assistant] is a keyword for the search).

The conversation No. 19 shows a question which inquires the detail of the assistant. Then, the following five sentences are selected and output as the detailed information of the assistant.

I help to solve problems.

I can cope with daily problems.

I can cope with physical problems.

I can cope with mathematical problems.

I can be an advisor.

The conversation No. 25 shows the operation that the artificial intelligence apparatus analyzes the human request 'Answer the questions' in response to the statement of the artificial intelligence apparatus that 'I help to solve problems.' The artificial intelligence apparatus evaluates that it is acceptable request, and generates and output the answer 'Yes.'

The operation that the artificial intelligence apparatus generates answers to the various questions which the human makes are explained below. The artificial intelligence apparatus analyzes questions and problems, activates programs to solve the problems automatically and generates answers. The answers are recorded in the recorder as the new knowledge, and it is possible to use them for the related questions in the future.

The conversation Nos. 27, 28, 29 are related to the problem about selecting the candidates which satisfy the requirement on the price range. The artificial intelligence apparatus detects the (Whichis) problem. (Process 9) The system automatically detects the type of the problems and searches for the relational information in the knowledge system. (In this case, the information about the range of price is searched.) The appropriate candidates are extracted by comparing the conditions of the questions and the relational information in the knowledge system. The candidates are recorded in the memory area in which the results of the processes are recorded.

The conversation No. 31 is the question that extracts candidates which satisfy the condition of the distance (e.g., below 1 km) from the candidates generated in the conversation No. 29.

The candidates which satisfy the condition of the price range are narrowed to four by the (Process 9). The (Process 10) narrows the four candidates down to candidates which satisfy the condition of the distance. The information about the distance of the four candidates is searched and checked whether the condition is satisfied. The candidates which satisfy the condition are selected rightly by the (Process 10). The candidates which satisfy the condition are recorded in the memory area.

The conversation No. 33 is the question that further extracts the candidates which satisfy the condition that the recommendation is sake. The candidates which are narrowed to three by the (Process 10) are checked whether the condition of the recommendation is satisfied, and recognized that there are two candidates (e.g., Restaurant C and Restaurant E) which satisfy the condition rightly. (Process 11)

The conversation No. 35, 36, and 37 show the operation that answer the questions using knowledge recorded in the knowledge system. As the knowledge, 'the price of three apples is 300 yen' is expressed. The question 'what is the price of five apples' is input. The artificial intelligence apparatus generates the answer of the question rightly by the following processes. (Process 12)

Step 1: Searching whether the information corresponding to the question (the price of 5 apples) exists as the knowledge or not. (If the information exists as the knowledge, an answer in generated by using the recorded information.)
 Step 2: If the information does not exist as the knowledge, searching whether the relational information relating to the price of apples exists as the relational information. (As the relational information, 'the price of three apples is 300 yen' is detected.)
 Step 3: Generating the answer to the question by using the relational information detected in Step 2. (A price of an apple is calculated, and then, a price of five apples are calculated to answer the price.)

The information generated in each process is recorded in the memory area of the pattern recorder, and it is possible to use the recorded information in later processes.

The conversation Nos. 39 to 42 are the problems about the differential equation. The following three sentences are input. (Process 13)
 Input Sentence 1: x0 is 4.
 Input Sentence 2: x1 is 5.
 Input Sentence 3: 2 d2x/dtdt+3 dx/dt+1=0

In response to the above input, the artificial intelligence apparatus performs the following processes sequentially.
 Step 1: Recording the initial values x0,x1
 Step 2: Detecting that the equation in the Input Sentence 3 is the differential equation, and activating a program to solve the differential equation
 Step 3: Searching for the input sentences and the recorded information and identifying information necessary to solve the differential equation (initial values x0, x1) and coefficients of the differential equation (C2, C1, C0)
 Step 4: Deriving solutions (form of solution, characteristic solution) of the differential equation The characteristic solutions (p1=−1.0,p2=−0.5) and the coefficients (A=−14,B=18) are derived rightly.

The conversation Nos. 44 to 47 are the problems about cross points of two functions.

The following three sentences are input. (Process 14)
 Input Sentence 1: f=x**2+2x−4
 Input Sentence 2: g=2x
 Input Sentence 3: What are the cross points of f and g?

In response to the above input, the artificial intelligence apparatus performs the following processes sequentially.
 Step 1: Extracting characteristics of f (Coefficients: C2, C1, C0)
 Step 2: Extracting characteristics of g (Coefficients: C2, C1, C0)
 Step 3: Extracting characteristics of h=g−f (Coefficients: C2, C1, C0)
 Step 4: Deriving x1,x2 by solving h=0

The solutions 'x1=−2,x2=2' are derived rightly.

The conversation No. 49 is the problem about an area which is defined by two functions. (Process 15)

The artificial intelligence apparatus detects the problem about the area which is defined functions, and performs the following processes sequentially.
 Step 1: Extracting characteristics of f (Coefficients: C2, C1, C0)
 Step 2: Extracting characteristics of g (Coefficients: C2, C1, C0)
 Step 3: Extracting characteristics of h=g−f (Coefficients: C2, C1, C0)
 Step 4: Integrating the function h=g−f, and deriving Coefficients of the integral of h=g−f
 Step 5: Deriving integral at [x1-x2]
 (A part of the above mentioned program to derive cross points of two functions is used in this process to obtain an area defined by two functions.)

As shown in the (Process 15), the integral "10.666" is derived rightly.

The conversation Nos. 51 to 56 are the problems of physics. (motion of the mass) (Process 16)

This is the problem to get the flying distance when the ball is thrown with the velocity of V m/s and the elevation angle of t deg.

The following sentences (1) The initial velocity of the ball is V, (2) The elevation angle of the ball is t, (3) V is 10 m/s, and (4) t is 45 deg are input to the artificial intelligence apparatus as the knowledge. Then, the question 'What is the flying distance of the ball?' is input to the artificial intelligence apparatus. The (Process 16) shows processes performed by the artificial intelligence apparatus. The artificial intelligence apparatus checks whether data relating the to flying distance of the ball exists as a first step. If the data related to the flying distance does not exist, the artificial intelligence apparatus activates a program to obtain the flying distance and searches for data relating to the initial velocity and the elevation angle of the ball. The artificial intelligence apparatus detects that the initial velocity of the ball is 10 m/s and the elevation angle of the ball is 45 deg from the knowledge. In the next step, the formula and the value of the flying distance are derived. Formula is 'V*V*sin 2t/g, and the value is 10.2041 m.

The conversation Nos. 58 to 72 are the problems of physics to generate the equations of motions. They show examples of operations to automatically generate the equations of motion using the knowledge of physics given by the human. This is the problem to solve the equations of mass motion which is connected to the spring and the damper. The solution is as follows.

Equation of motion: $d2x/dt2+(D/M)dx/dt+(K/M)x=g$

The conversation Nos. 58 to 66 show that the knowledge and questions regarding the equation of motion are input in the artificial intelligence apparatus. The (Process 17) shows that the input knowledge and questions are stored in a memory unit of the recorder.

In the (Process 17), the question 'What act on the body?' is input. The artificial intelligence apparatus detects 'What **is*?' problem, and searches the relational information in the recorder autonomously. The relational information is searched from the memory units No. 71, 72, and 73. The information which is extracted is the types and contents of the term ([3], [2], [1]). The definitions of types of the terms are shown below. The type 3 shows that the term has the type (±symbol·x), the type 4 shows (±symbol·dx/dt), the type 5 shows (±symbol·symbol). The relational information which is extracted at the (Process 17) is as follows.
 Memory unit 71: −k x
 Memory unit 72: −d dx/dt
 Memory unit 73: + m g
 0: No data, 1: symbol, 2: ±symbol, 3: ±symbol·x, 4: ±symbol·d_x/_dt, 5: ±symbol·symbol, 6: ±d2x/_dtdt The (Process 18) shows an example of the operation when the question 'What is the equations of motion' is input. The artificial intelligence apparatus operates as bellow and derives the solutions rightly.

Step 0: Searching whether data (equations of motions) corresponding to the question exists in the knowledge. (If the data exists in the knowledge, generating the answer using the recorded data)

Step 1: If the data does not exist in the knowledge, generating the equations of motion using the relational information (force which act on the body: Information in the units No. 71, 72, 73).

Step 2: Arranging the equations. (move terms)
Step 3: Arranging the equations. (normalize terms)
Step 4: Displaying the equations of motion.

The identifying number and symbols of every processes which correspond to the terms of the equations are shown at (Process 18) to indicate the processes easily. The equation of motion is derived using the following relation in the step 1.

m d2/dt2=force which act on the body (−k x−d dx/dt+m g)

At the step 2 and step 3, the equation is arranged (move terms, normalize terms) and the final equation is derived rightly. It is possible to solve the equation easily using the initial conditions (x0,x1) and the programs to solve differential equations as explained above. It is possible to cope with symbol processing of the equations, because the numbers, symbols and operators are arranged and recorded in the structures for easy processing. And it is also possible to interpret the equations and solve them.

The conversation Nos. 73 to 78 are the problem of physics (specific gravity) (Process 19). The specific gravity is derived by obtaining a volume from information of a shape of the body (cube) and size, and searching information about a weight of the body.

The conversation Nos. 80 and 81 are conversations by the human and conditional sentences. The artificial intelligence apparatus checks a validity of the condition 'If the specific gravity of the body D is below 1' in the conversation. Since the artificial intelligence apparatus has already obtained the knowledge 'the specific gravity of the body D is 0.5' in (Process 19), the artificial intelligence apparatus confirms that the condition is valid based on this knowledge. Then, the artificial intelligence apparatus outputs the sentence 'The body D floats.'

The examples of operations of the artificial intelligence apparatus to solve problems are explained above. The artificial intelligence apparatus has the ability to solve various problems besides those examples. The artificial intelligence apparatus can solve the problems which can be solved by the human and meet the following conditions.

Condition 1: Information and parameters which are necessary to solve problems are included in sentences of the problems or in the information recorded in the past.
Condition 2: Procedures for handling the information and parameters to solve the problems can be defined.

To solve problems, the human searches for and recognizes information which is necessary to solve the problems, processes the searched information according to the procedures for handling recorded as the knowledge. The artificial intelligence apparatus of the embodiments has the ability to solve problems as humans do.

The artificial intelligence apparatus recognizes the type of the problems, analyzes the key parameters to solve the problems and searches the key parameters. If the artificial intelligence apparatus cannot search for the key parameters, the artificial intelligence apparatus activates a program to generate the key parameters to solve the problem. That is, the artificial intelligence apparatus searches the knowledge for the procedures to solve the problem, and proceeds the processes according to the procedures. Additionally, the artificial intelligence apparatus recognizes the key parameters which are necessary to solve the problems, and searches the knowledge system for a state of the key parameters. The artificial intelligence apparatus solves the problems using the states of the key parameters if they are searched. The artificial intelligence apparatus activates the programs to generate the states of the key parameters if they are not searched. When the programs are activated, a new state of the key parameters might become necessary. In this case, the artificial intelligence apparatus activates the programs to search for the new state of the key parameters or generate the new state of the key parameters by repeating the above procedures. Accordingly, the problems originally set can be solved.

The features of the artificial intelligence apparatus of the embodiments are described below. The characteristic feature of the artificial intelligence apparatus is that the processes of solving problems are very clear. The information of each memory unit of the artificial intelligence apparatus (e.g., matching conditions, patterns, connective relations between patterns, relations between patterns and results of the pattern analysis) is converted to patterns from the words and symbols which can be understood by the human. It is possible to confirm the validity of the logics easily, because the states of the memory units and the relations between the memory units are clear. It is also possible to monitor the every processes in the artificial intelligence apparatus, and they are understandable and clear for the human. That is, the artificial intelligence apparatus is a system which the human can confirm the validity and safety. The knowledge system of the artificial intelligence apparatus is constructed with checking that it is not against the truth, facts, rules and morals. Since the information against the morals and rules are detected and rejected, the incorrect knowledge (i.e., a knowledge against the morals and rules) are not included. Accordingly, it is possible to manage the artificial intelligence apparatus not to be inconsistent with the rules, common sense and the morals of humans when it expands the ability of autonomy, functions and performance.

As for the 'symbol grounding problem' regarding whether the knowledge system of the artificial intelligence apparatus is consistent to the real world, the knowledge system of the artificial intelligence apparatus uses 'words, sentences, symbols, numerical expressions, physical expressions and chemical expressions' corresponding to the real instructed by the human as source data. The knowledge system converts the source data to pattern, and arranges a relation between the information being a connective relation between the patterns. Therefore, it is essentially equivalent to and consistent with the 'real' corresponding to the input information.

The intelligence and the knowledge of the human is input and evaluated as the information such as language, words, and sentence in the artificial intelligence apparatus. The artificial intelligence apparatus analyzes a relation between the safe and valuable information and the recorded knowledge and includes in the knowledge system autonomously. The knowledge system develops like a self-organized system evaluating the input information by comparing it with the recorded information and including the valuable information with adding the results of the analysis. The knowledge system constructed like this way is a database which corresponds to the human intelligence, and it is possible to use it for solving problems and conversations. The artificial intelligence apparatus narrows the information among the relational information by selecting the appropriate relations from the knowledge system and proceeds the thinking processes to the goal autonomously.

The artificial intelligence apparatus forms the connective relations between the information autonomously by inputting the information about the truth, facts, rules, common sense, definitions and logics. The patterns corresponding to the input information are activated, and the connective relations between the patterns (concepts) are strengthened by human instructions and self-learning. The sentences do not exist alone but have relations to each other and are positioned in the contexts. The later sentences have influence of the former ones. The artificial intelligence apparatus includes a function that activates patterns corresponding to the input sentences and strengthens the connective relations between the patterns by recording the activation history of the former patterns in the each memory for the connective relations. This function enables learning so that all patterns corresponding to sentences are activated according to the relations with the associated sentences, i.e., context. By inputting many words and sentences, a network of the contexts are formed autonomously. And when a concept (word, sentence) is input, the concept transits according to the formed contexts.

FIG. 26 shows an operation to form contexts from input information step by step. When the information is input, a value and newness of the input information is evaluated and recorded in the memory units. If the information is already recorded, the recorded information is activated. The activation history at the most recent time is recorded in the memory for the connective relations and the connective relations between the memory units which activated at the most recent time are strengthened. The memory unit of the certain information activates the memory units which have connective relations step by step. The input concepts (information) transit according to the formed contexts by this operation.

When the contexts are formed, prediction and estimate can be performed. Since the concepts transit according to the formed contexts, when a concept is input, the concept arrives at a concept which corresponds to an event such as the logical conclusion, the result and the prediction, which are derived from the input concept. This means that the concepts corresponding to the prediction and estimate are activated.

It is possible to construct the knowledge system autonomously which corresponds to the truth, facts, rules, common sense, definitions and logics by forming the relations between information about them. When the learning progresses, it is possible to recognize that the input information is consistent or inconsistent to the recorded information. This means that the artificial intelligence apparatus obtains the intelligence corresponding to the truth, facts, rules, common sense, definitions and logics. It is possible to transit the information (concept) using the formed contexts, and it is also possible to transit the information (concept) by searching for associated information using the key words included in the information. It is possible to perform conversations as humans do by combining various types of thinking pattern transitions.

It is possible to answer the questions not only by searching for the relational information in the knowledge system but also by interpreting the questions, searching for relational information, processing the searched information. This is performed by recognizing the types of the questions, searching for the information corresponding to the answer to the question, activating the programs which generate the information corresponding to the answer when the information does not exist in the knowledge system. It is possible to solve problems autonomously by searching for the information corresponding to the answer in the knowledge system and by activating the programs to generate necessary information step by step when the necessary information does not exist in the knowledge system.

In order to form connective relations between patterns by human instructions, a pattern corresponding to a next concept (e.g., words, sentences) is activated after the activation of one pattern corresponding to a concept (e.g., words, sentences). The connective relation between the concepts is formed by generating the connective relations to transit from the pattern which is activated first to the pattern which is activated second. When the same pattern is activated, the patterns are activated autonomously according to the formed connective relations. The appropriate relations are selected by human instructions or automatic setting when the several patterns for transition exist. The automatic setting of relations is performed by the function that analyzes the goal and status of the transition and sets appropriate relations.

The artificial intelligence apparatus of the embodiments is widely used and has various application areas. Some examples of the application areas are explained below. The expression 'AI' is used here, and it is possible to apply for robots and intelligent equipment which install AI.

Personal AI

A Personal AI is an artificial intelligence which is constructed for personal use by inputting personal information (recording of personal thoughts, someone to talk to, adviser, assistant, and partner).

FIG. 23 shows a construction of the personal AI. The knowledge system is constructed in the recorder by inputting the information and analyzing the relations between the information. It is possible to detect contexts by strengthening the connective relations between the information. The artificial intelligence which is constructed for personal use is generated by inputting the personal thoughts, hobby, interest and themes in the language.

General AI

A General AI is an artificial intelligence which learns rules, common sense and morals and is constructed for general use by learning special knowledge (e.g., mathematics, physics, chemical, laws, design, science etc.), and helps the human in the various fields.

FIG. 24 shows a construction of the General AI. The knowledge system is constructed in the recorder by inputting the information and analyzing the relations thereof. It is possible to detect contexts by strengthening the connective relations between the information. The General AI is generated by inputting the truth, facts, common sense, rules, morals, special knowledge, theorems, definitions and logics in language.

Large Scale AI

A Large Scale AI is the artificial intelligence which is constructed by strengthening the special knowledge of the General AI and harmonizing a network of group of a Specialized AI and Management AI, and helps the human to solve the difficult problems which require several special knowledges.

FIG. 25 shows a construction of the Large Scale AI. The Large Scale AI comprises a plurality of the Specialized AI and Management AI in which the several General AIs shown in FIG. 24 are strengthened the special knowledges. The management AI analyzes the types of the problems and recognizes the fields and the information to solve the problems. The information which is needed to solve the problems is divided into the fields and a request for reply is send to the corresponding Special AI. It is possible to use the language, symbols and numbers for the interface between the humans, the Special AIs and the Management AI.

Hobby AI, Game AI

A Hobby AI and Game AI are the artificial intelligence which are constructed for collecting, arranging and reporting the information of interesting fields and themes. The knowledge of the artificial intelligence is developed, and the knowledge and capability of the artificial intelligence is used by the members of the circles which is developing the capability of the artificial intelligence.

Effects of the Invention

According to the embodiments, it is possible to construct the knowledge system autonomously by analyzing the sources, reliability, newness, fields, themes, the subject, modifiers of the subject, predicate, modifiers of the predicate, relations of the modifiers, 'when', 'where', 'who', 'what', 'how', 'why' and 'what do', of the input information and arranging and recording the information which is evaluated as valuable. It is also possible to evaluate the information by comparing with the recorded information in the knowledge system, and to execute the appropriate processes autonomously (e.g., recording the information, updating and modifying the knowledge system, executing the instructed matter, answering to the questions). Furthermore, it is possible to generalize a part of words included in the information, to extract relations between the significant information and to construct a common sense, a general way of thinking, and a solution to solve the problem autonomously by strengthening the connective relations between patterns corresponding to the generalized words of the information.

It is necessary to install programs and to drive the machines to execute the processing of the information in the conventional machines. It is necessary to design the programs to detect situations and judge the operations under the various conditions, install in the computers and execute the programs in the conventional machines. The programs have to be designed with dedicated programming language while keeping the programming rules, and it takes much time and efforts. It is necessary to modify the programs by the human when the detection of the conditions and the operations are not appropriate, and it takes also much time and efforts.

According to the embodiments, it is not necessary to design each program for the operations, since the artificial intelligence apparatus of the embodiments learns how to process the information and execute the processing. It saves much time and efforts, since the information regarding how to process the information is input in the language and the artificial intelligence apparatus learns and records how to process the information. The system is very flexible and useful since a change of the processes is performed by changing the patterns and the connective relations between the patterns without changing the programs.

It is necessary to determine variables, constants and contents of the processes beforehand in the conventional programming, and it takes large efforts to realize the processes when many branches exist according to the processes (actually, it is difficult to be realized). On the other hand, in the embodiments, a search of the information corresponding to the variables and constants is performed using the patterns which are combined patterns corresponding to the language (words, symbols), and it is a searching method as humans do. This is the searching system of the associative memory, and it is not necessary to define the memory area of the variables and constants exactly beforehand. It is possible to register the information when it is newly generated by combining the patterns of words and symbols as the searching key. It is possible to search the recorded information using searching patterns which is generated by combining the patterns of words and symbols. This allows the system to be free from the restrictions about the definition of variables and constants.

Furthermore, it is possible to perform a process corresponding to conditions according to a situation (recognizing whether to satisfy the condition based on the pattern and a result of the analysis of the pattern) step by step. When an additional process appears, the condition is analyzed and the process is determined. It is possible to proceed the processes as humans do by interpreting the processes (a group of conditional sentences) expressed in the language. The information which is generated newly at the processes is recorded using the combinations of words as the searching key, and it is possible to search the information easily when the information is required at another processes. The system has the capability to use the information which is generated and recorded in the knowledge system when it becomes necessary in the future. It is possible to generate and record the information in the knowledge system, and it is possible to proceed the processes by searching for the information in the knowledge system. And it is also possible to select the searching area of the knowledge system, for example, whole area or the area which is accessed lately, etc.

By inputting a method or procedure to solve the problem expressed in language, the artificial intelligence apparatus of the embodiments can solve the problem which is solved by the human with their thinking (language), based on the method or procedure to solve the problem. It is possible to show the methods and procedures clearly and solve the problems by inquiring and checking them when there exist ambiguity in them. It is also possible to proceed the processes autonomously by checking the validity of the conditions by entering the methods or procedures expressed in the language (sentence) for the human. It is possible to solve the problems and decide the actions as humans do by inputting the knowledge (procedures and thinking method to solve problems and decide actions) expressed in the language without programming. The artificial intelligence apparatus activates the memory units which are required to solve the problems and recognizes the solving programs and executes the programs autonomously. The artificial intelligence apparatus detects and learns the contexts, generates the conversations considering the contexts (questions, responses, providing topics being interested, opinions and arguments), gathers the information about the designated persons and items (interesting themes, opinions about the problems, response to the items, opinions and actions, detail information) and records.

The knowledge system of the artificial intelligence apparatus is constructed based on the truth, facts, rules, common sense, definitions and logics, and the information which is inconsistent to them is not included in the knowledge system. The artificial intelligence apparatus is a clear system where all processes are represented with words and symbols which humans can understand. The knowledge system of the artificial intelligence apparatus is constructed based on the right information which humans accumulates, and all processes can be monitored and displayed as humans can understand. Therefore, it is possible to realize the artificial intelligence apparatus which solves the 'symbol grounding problem' and is free from going out of control. It is possible to expand the knowledge by solving the problems using it and including the new generated information which is obtained by activating the appropriate programs. It is possible to use the knowledge which humans have accumulated and to activate appropriate programs which humans have developed, and it is possible to realize the artificial intelligence apparatus which has both flexibility of humans and processing power of a computer.

BRIEF DESCRIPTION OF THE DRAWING

FIG. 3 shows an example of evaluation of input information.

DESCRIPTION OF THE SYMBOLS

Figure 1:
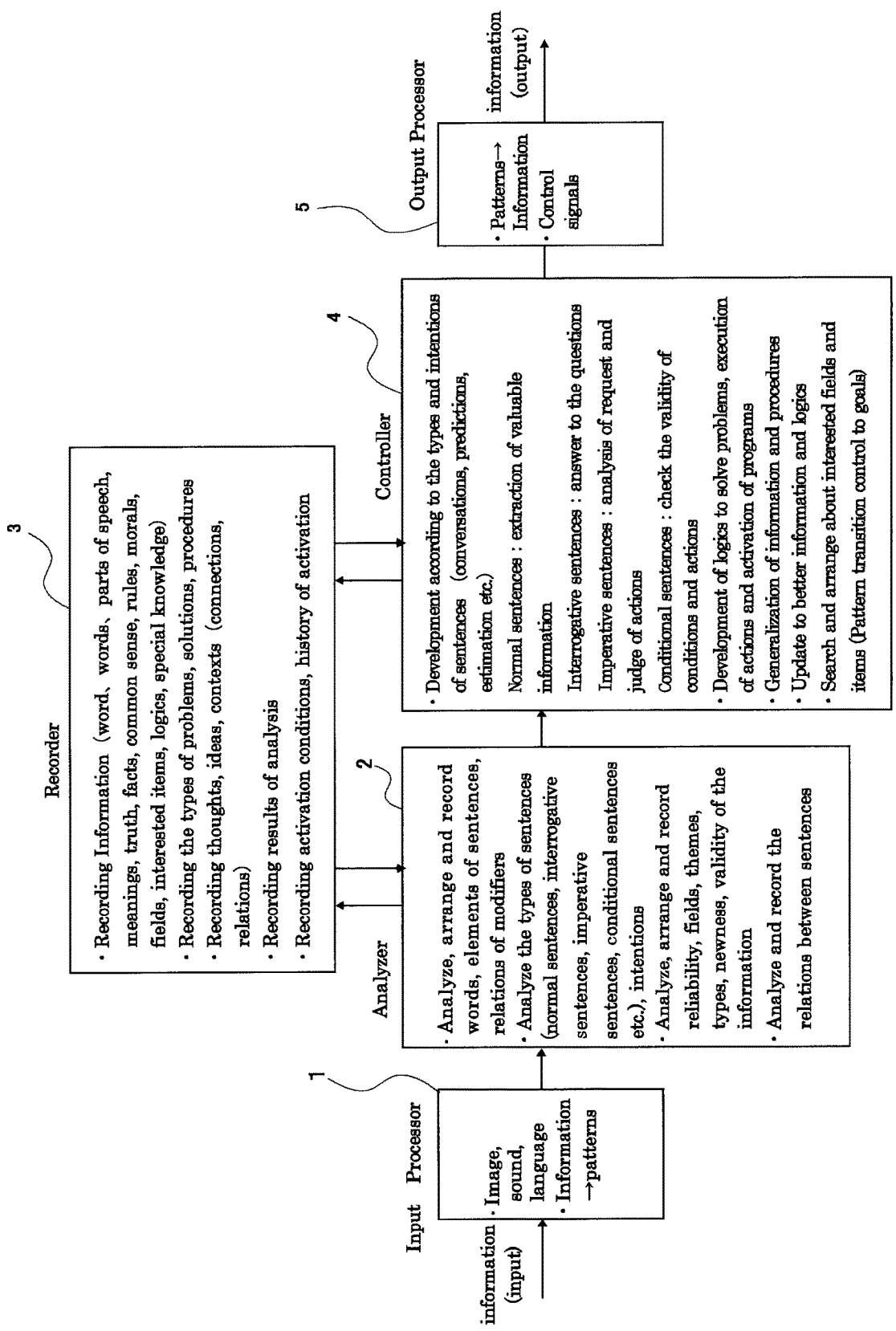
FIG. 1 shows a functional block diagram of an artificial intelligence apparatus.
Figure 2:
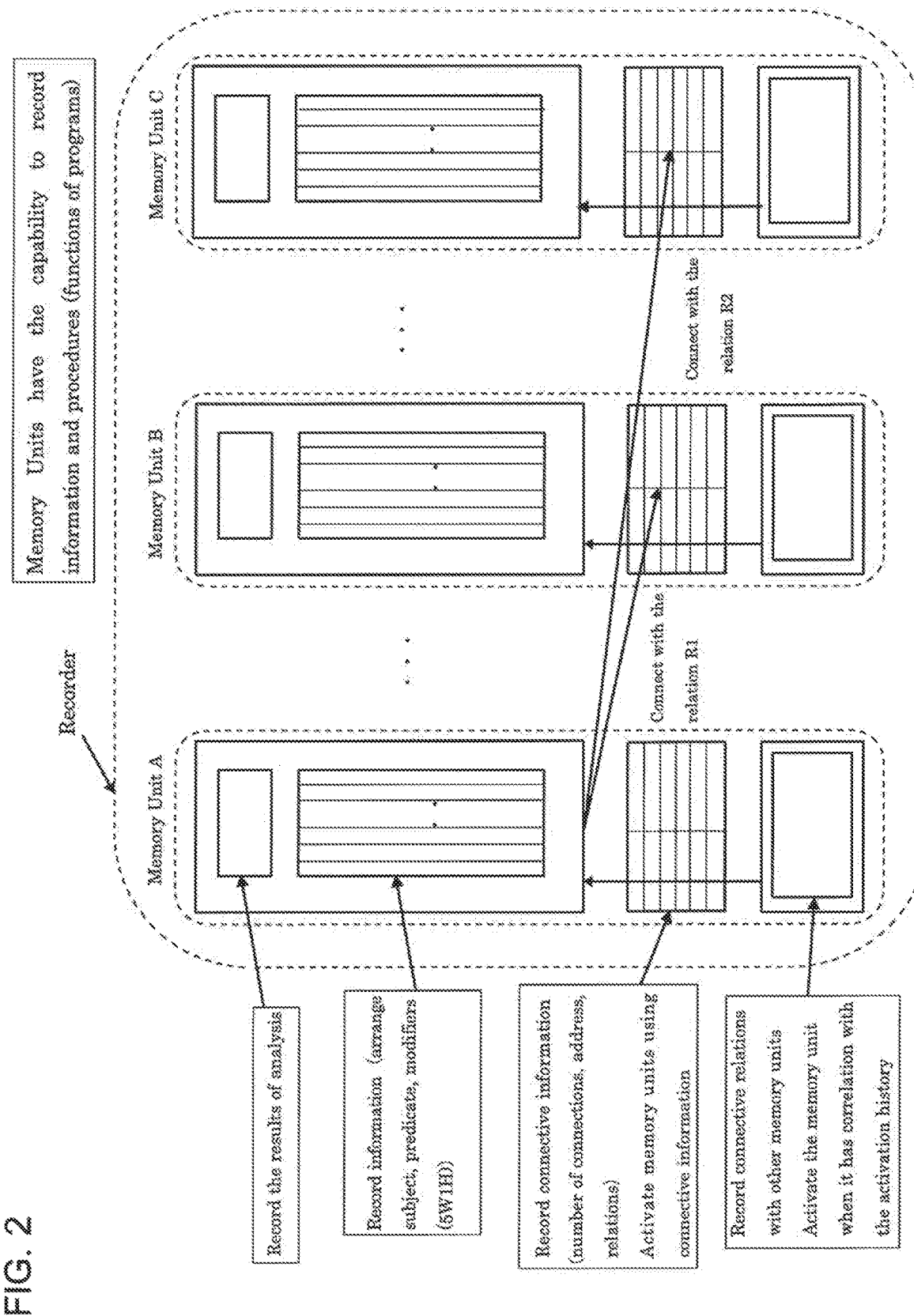
FIG. 2 shows a function of a recorder.
Figure 4:
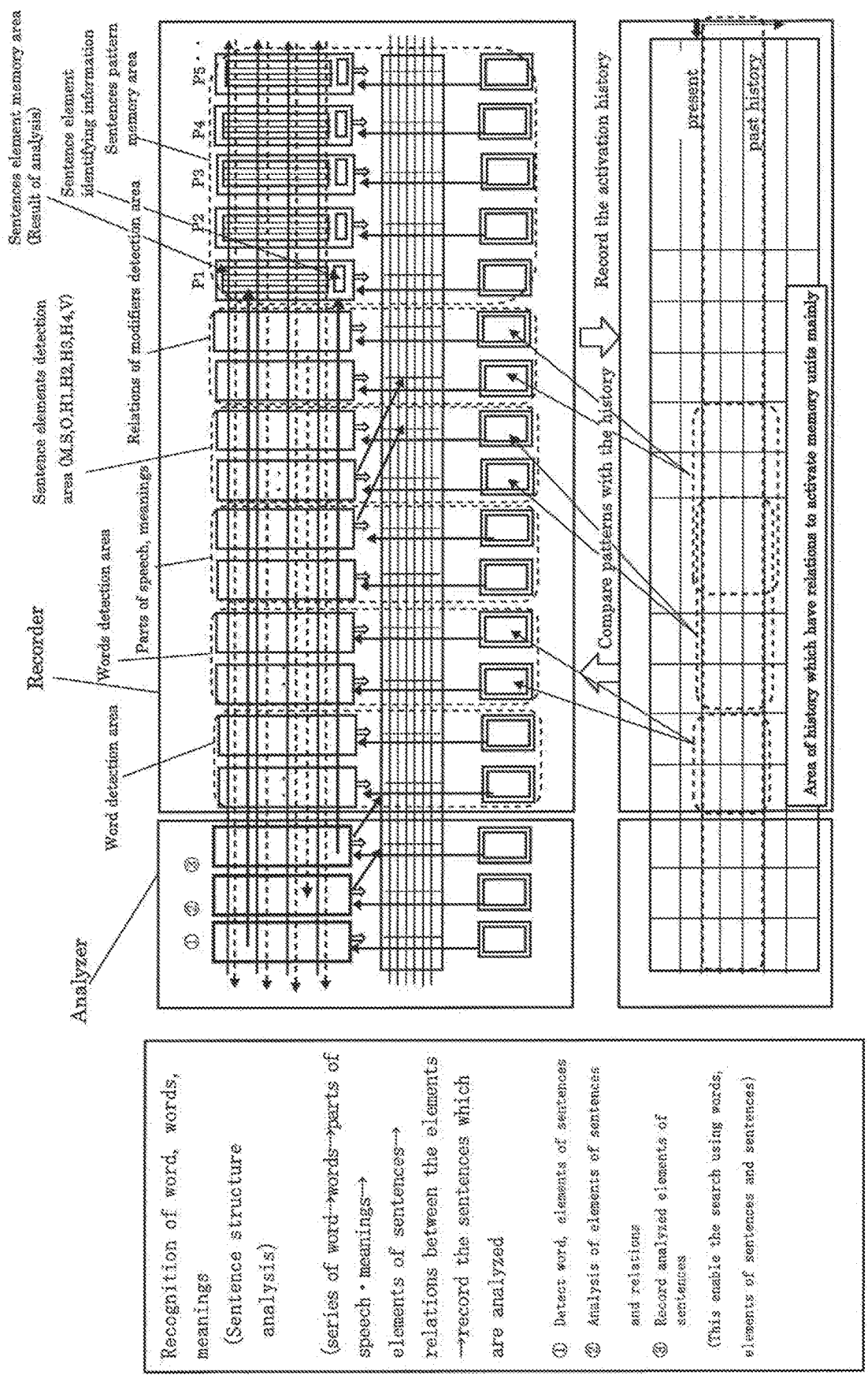
FIG. 4 shows a function to recognize words, meanings and elements of sentences.
Figure 5:
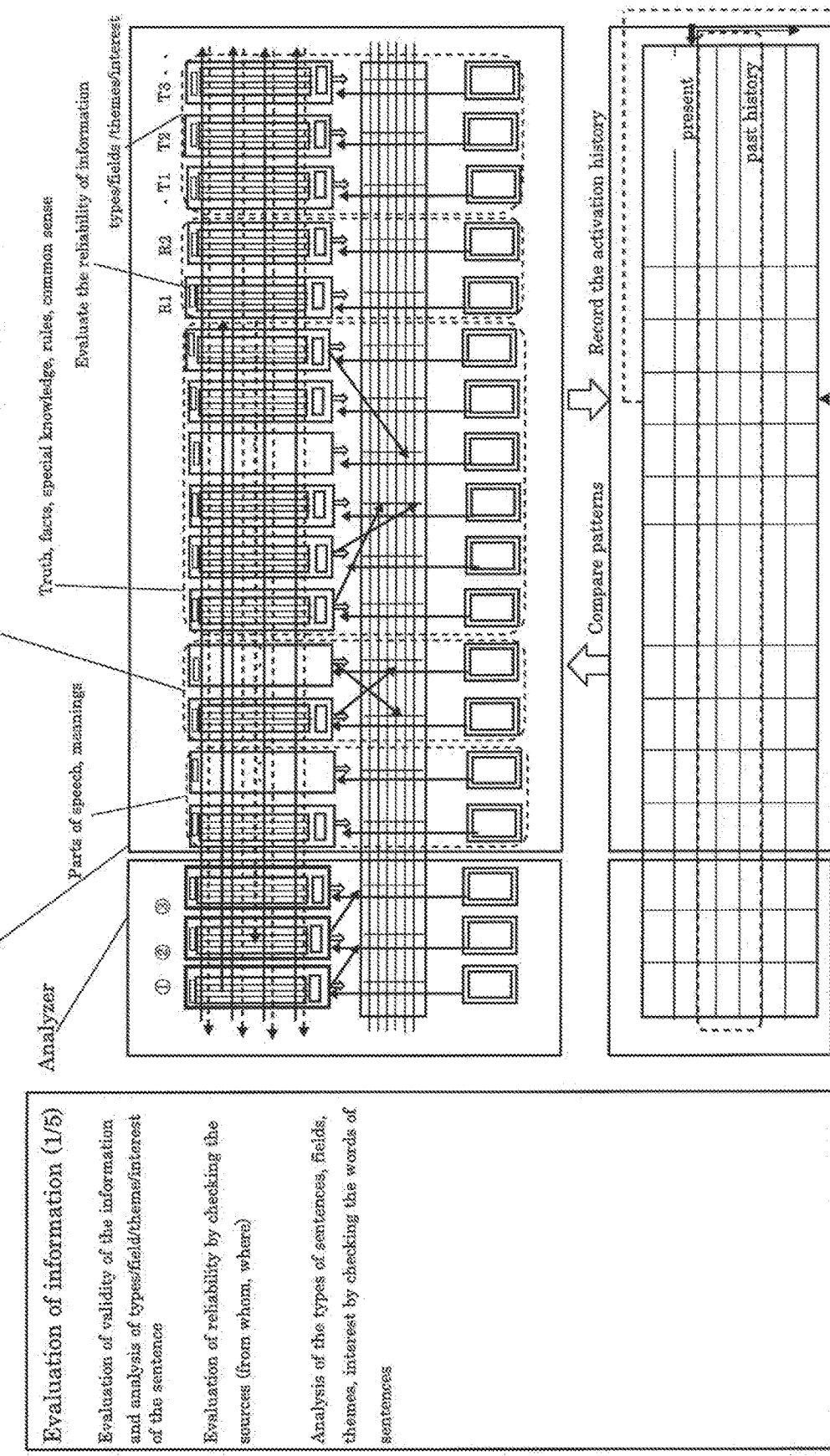
FIG. 5 shows a function to evaluate input information (1).
Figure 6:
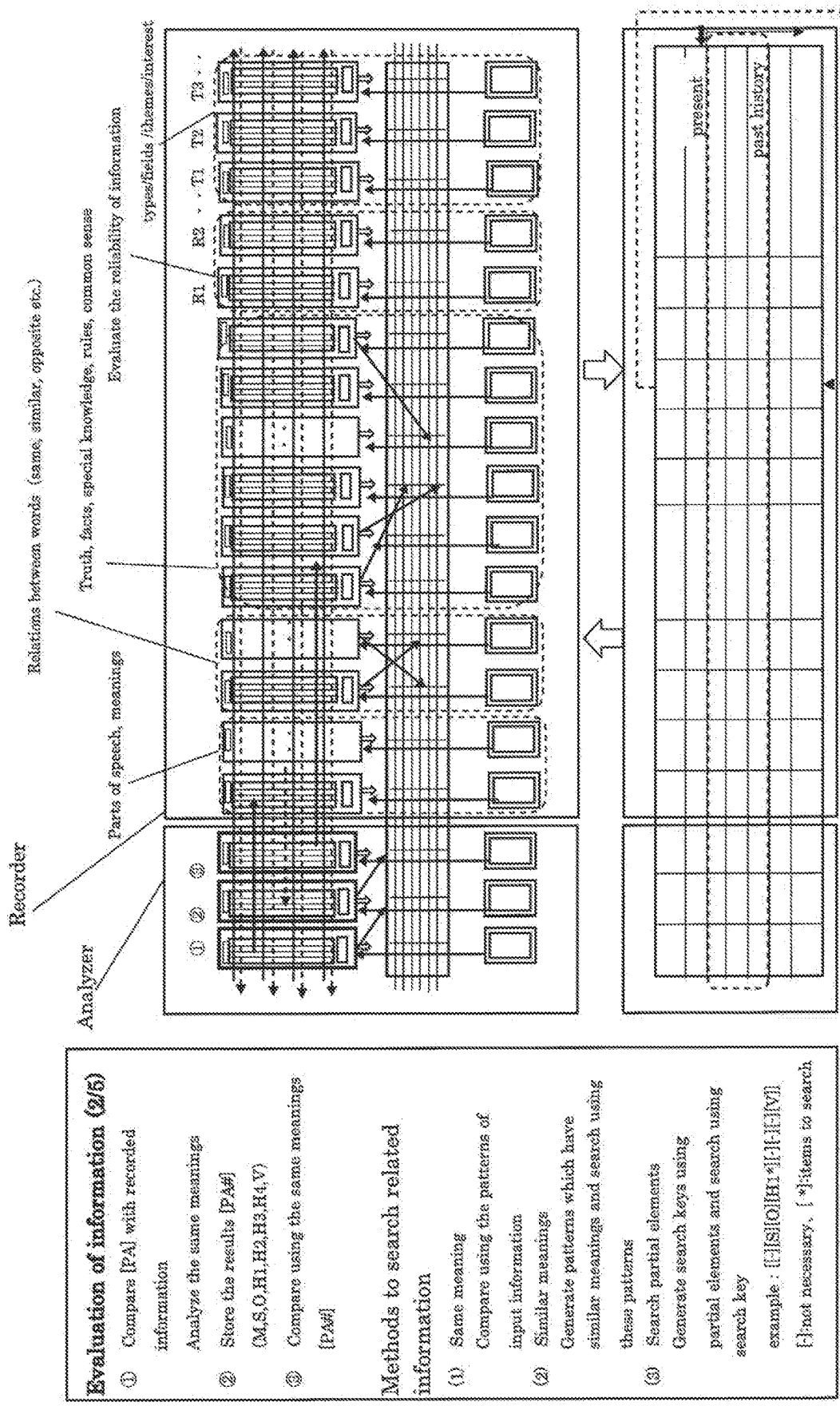
FIG. 6 shows a function to evaluate input information (2).
Figure 7:
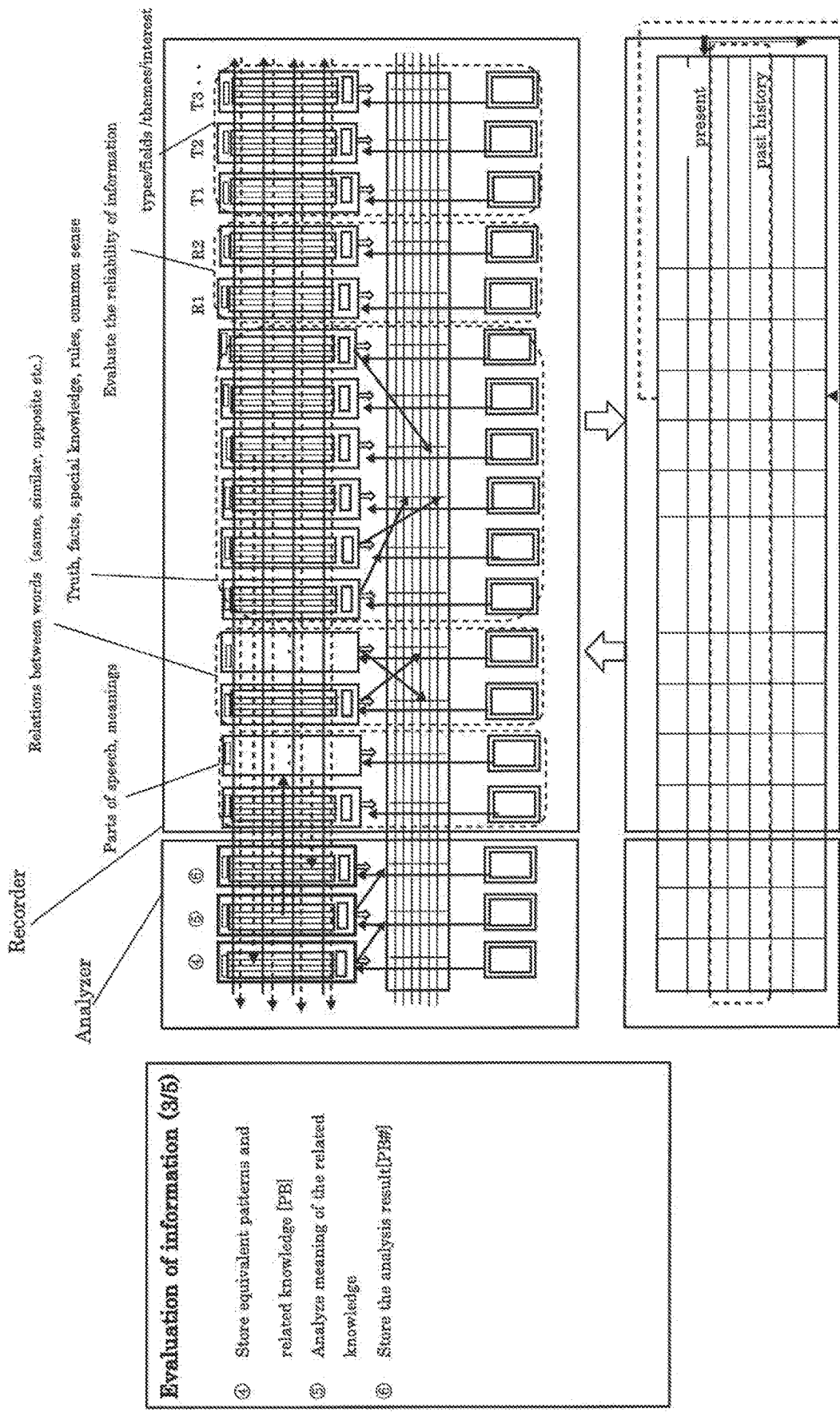
FIG. 7 shows a function to evaluate input information (3).
Figure 8:
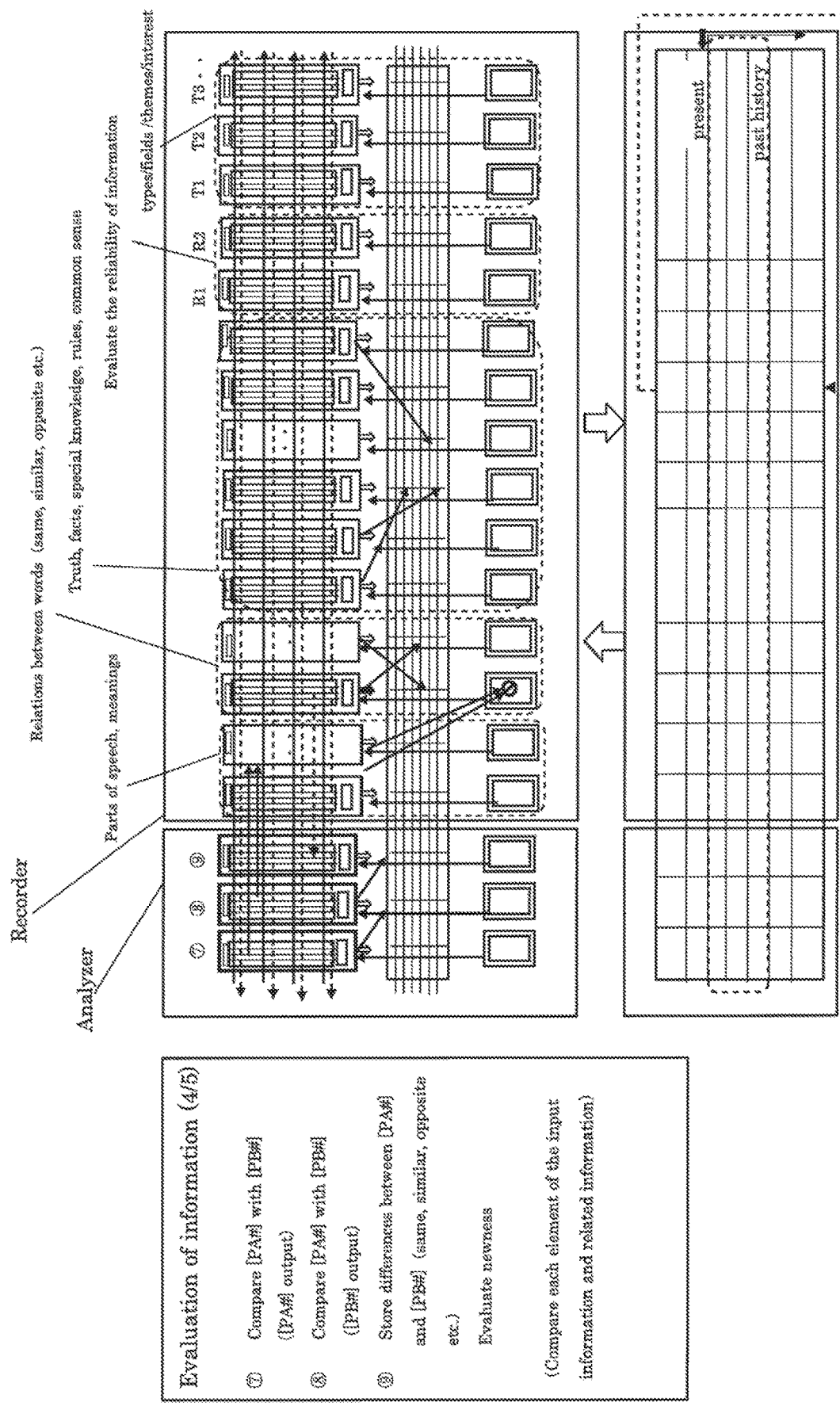
FIG. 8 shows a function to evaluate input information (4).
Figure 9:
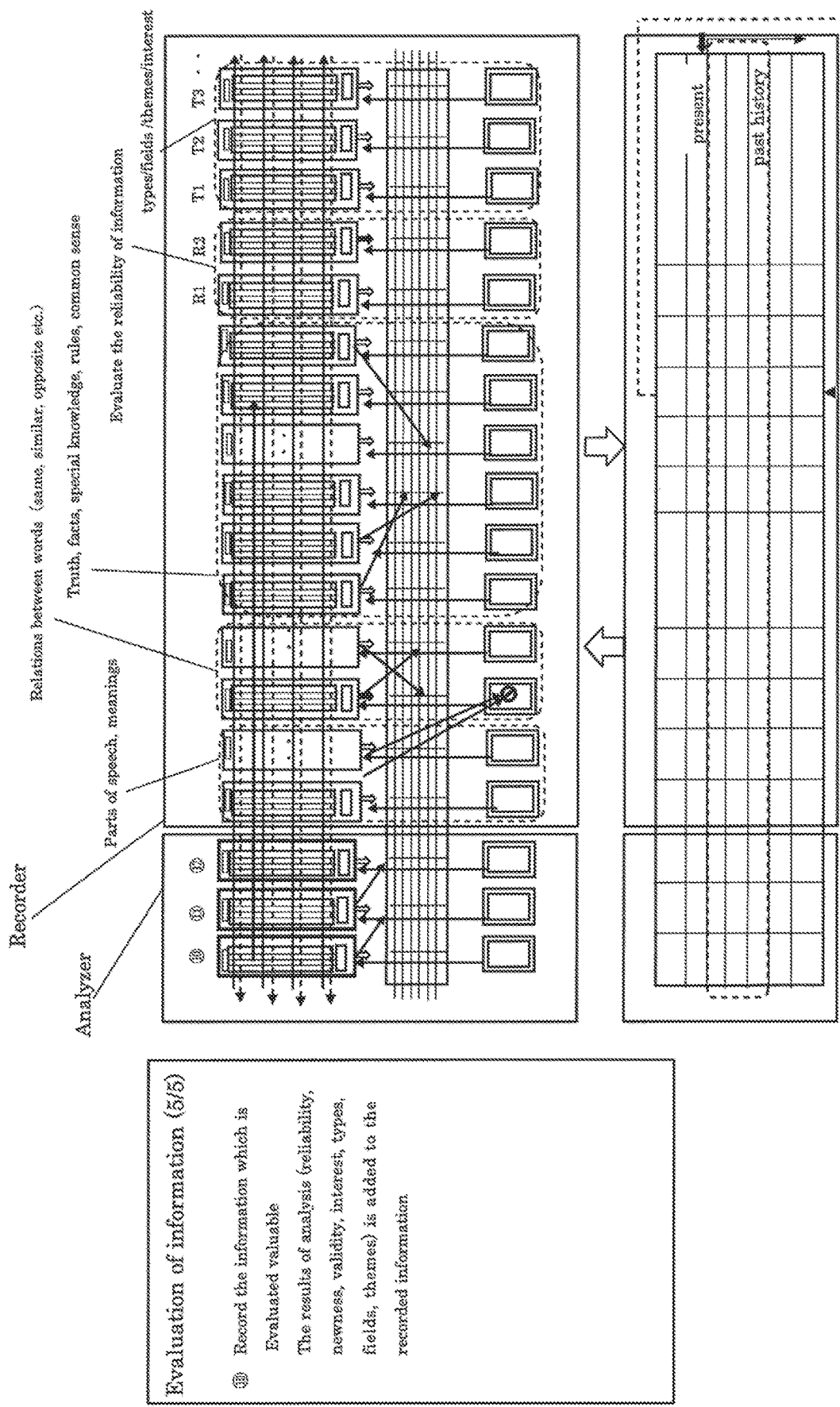
FIG. 9 shows a function to evaluate input information (5).
Figure 10:
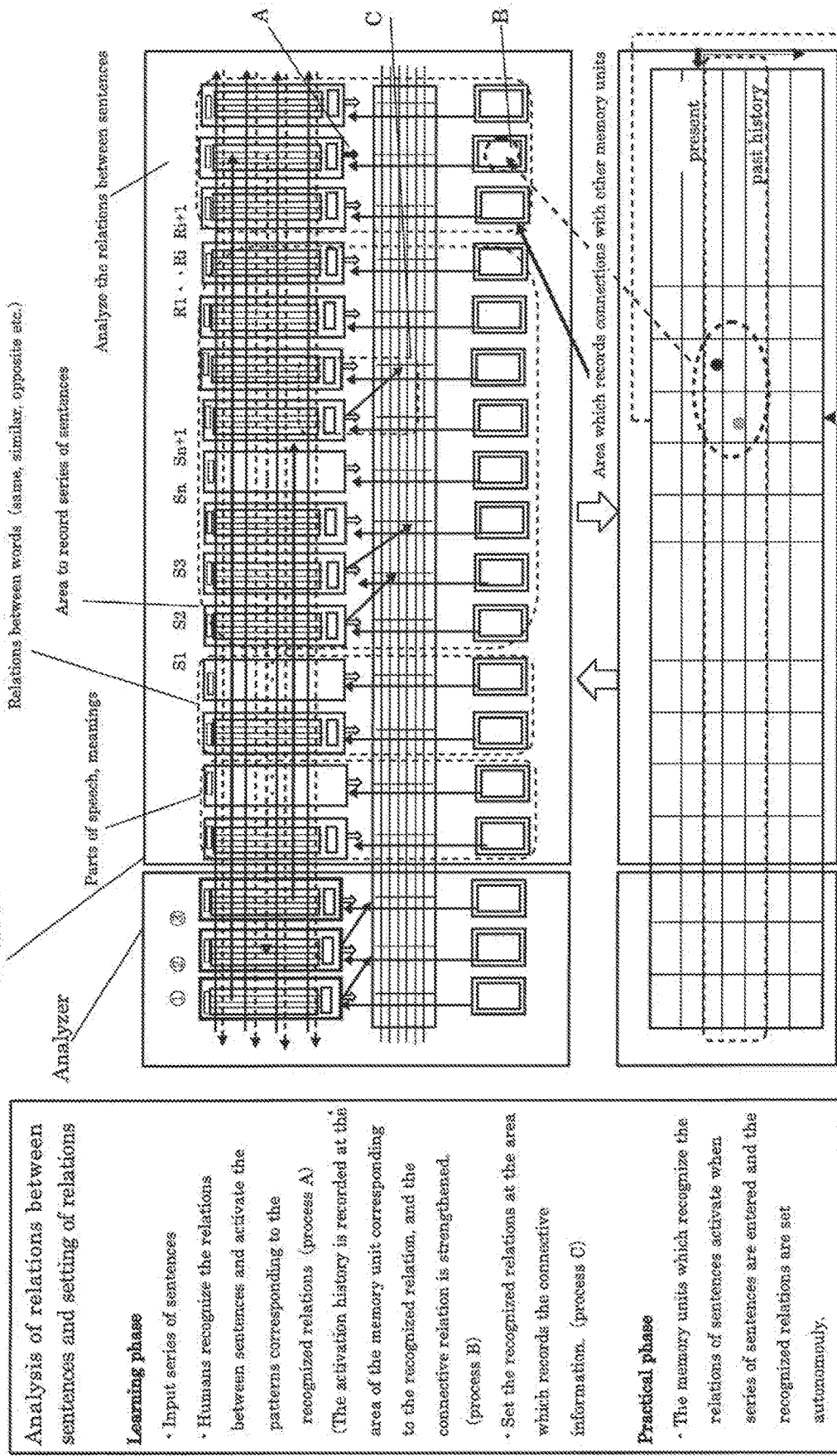
FIG. 10 shows a function to analyze and set relations between sentences.
Figure 11:
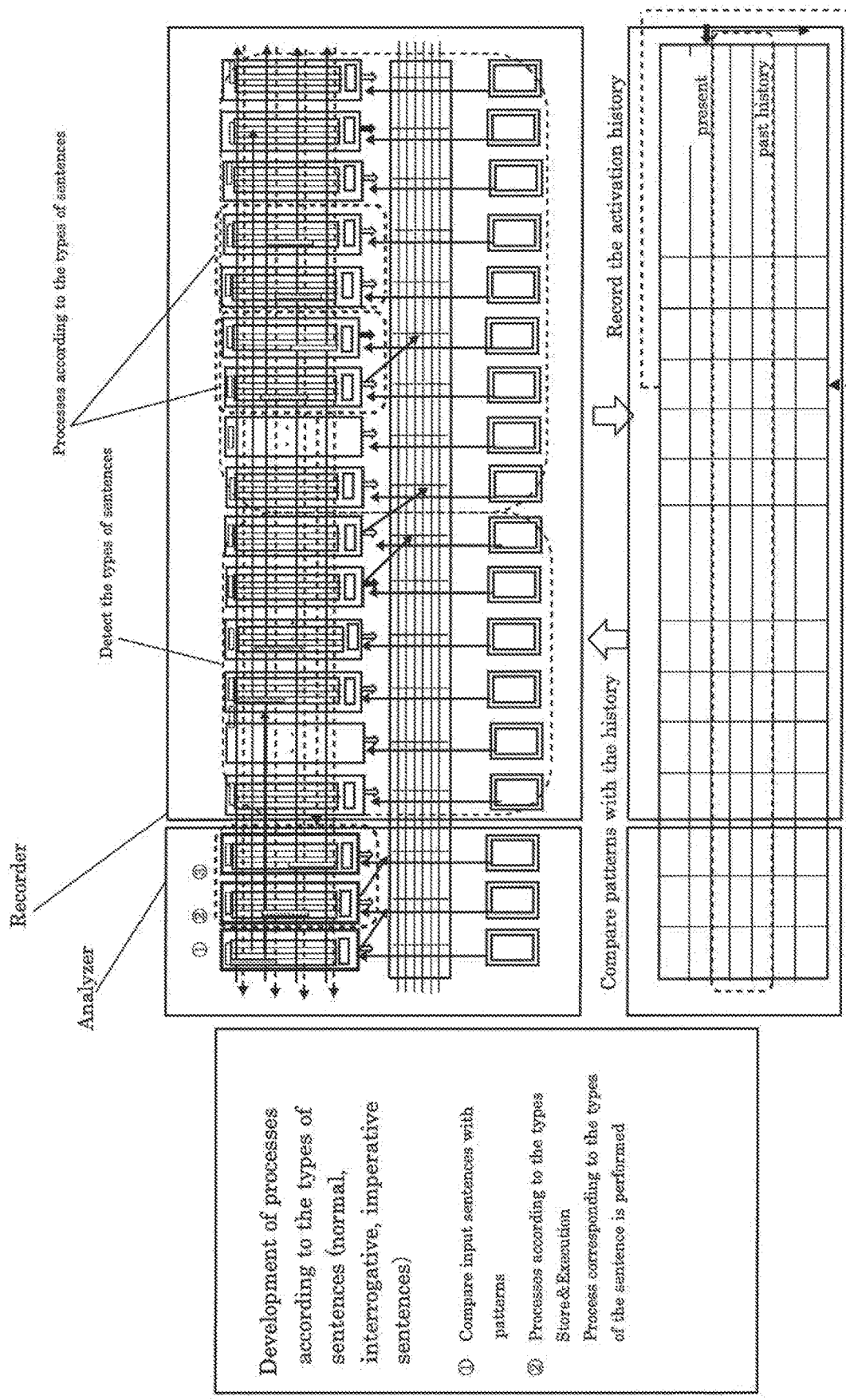
FIG. 11 shows a function to develop processes according to results of the analysis.
Figure 12:
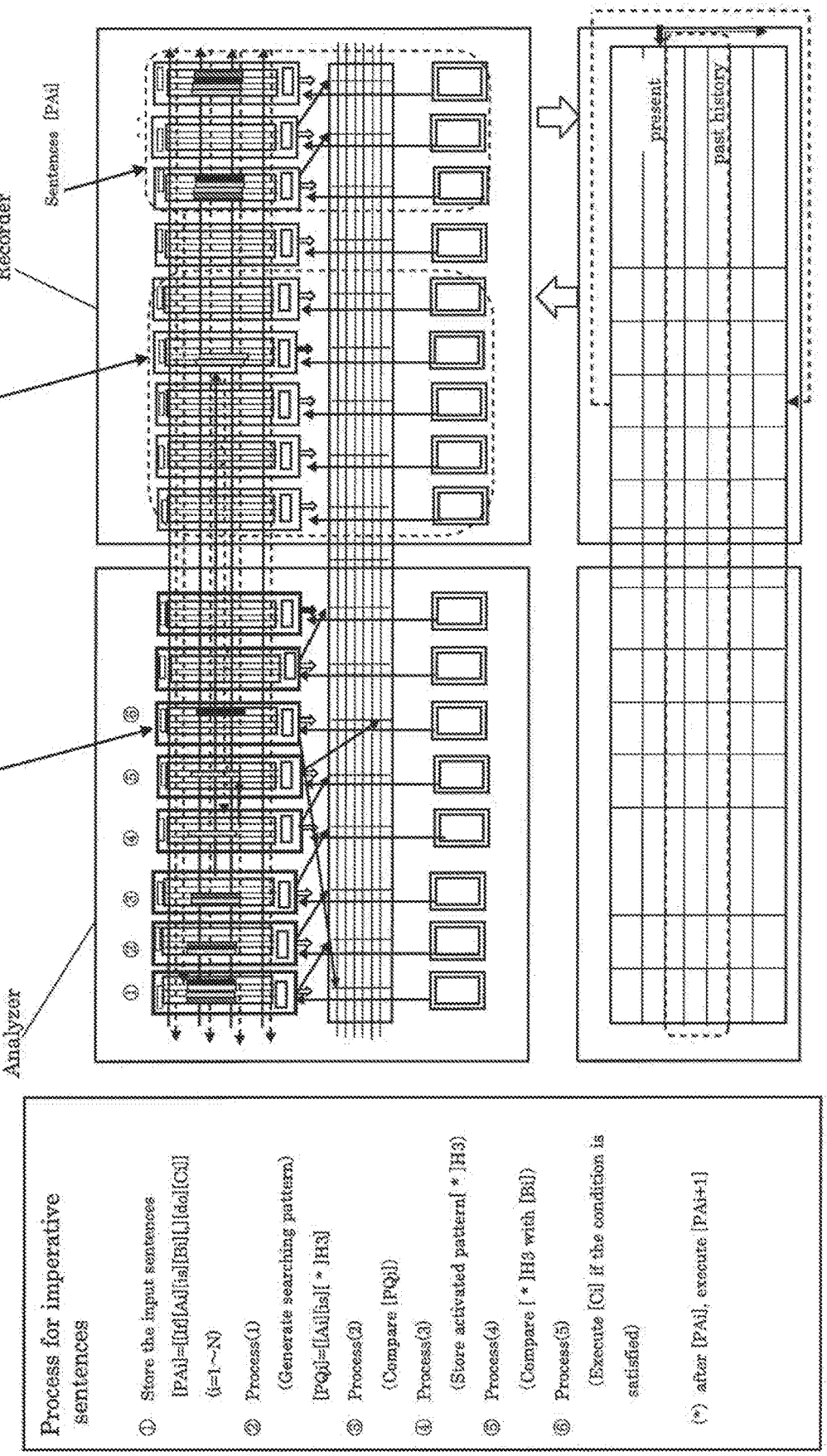
FIG. 12 shows a function to cope with imperial and request sentences.
Figure 13:
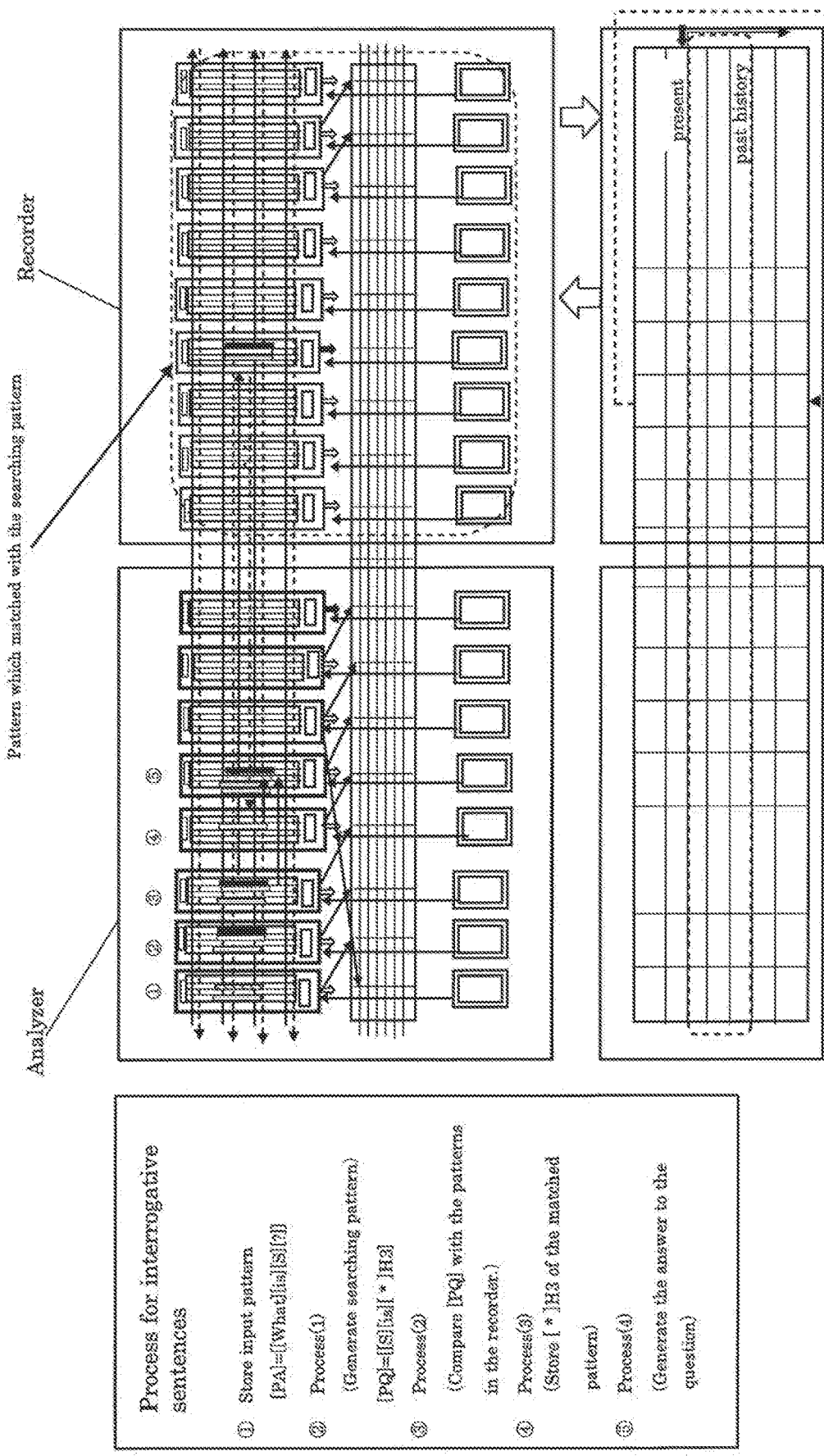
FIG. 13 shows a function to cope with interrogative sentences.
Figure 14:
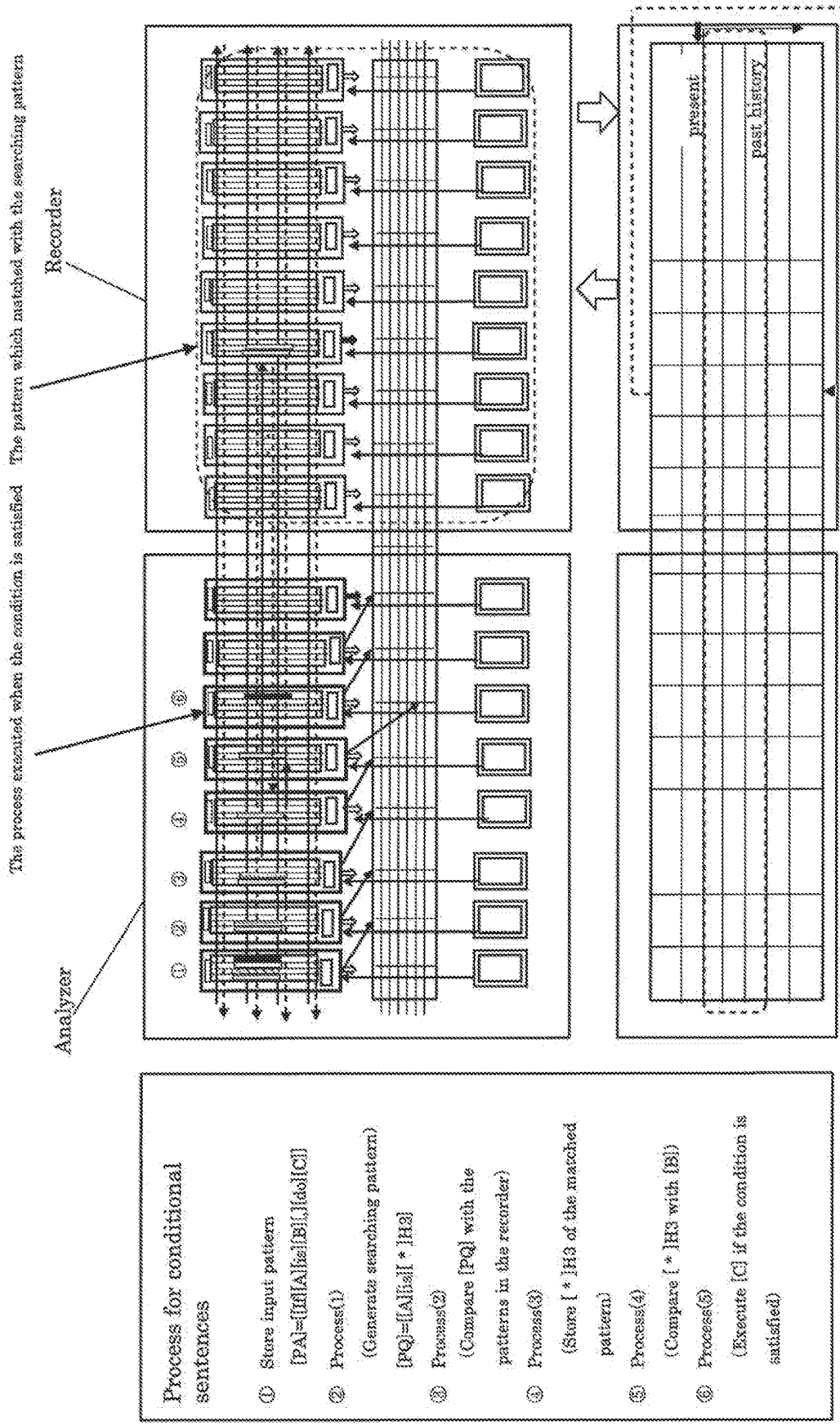
FIG. 14 shows a function to cope with conditional sentences.
Figure 15:
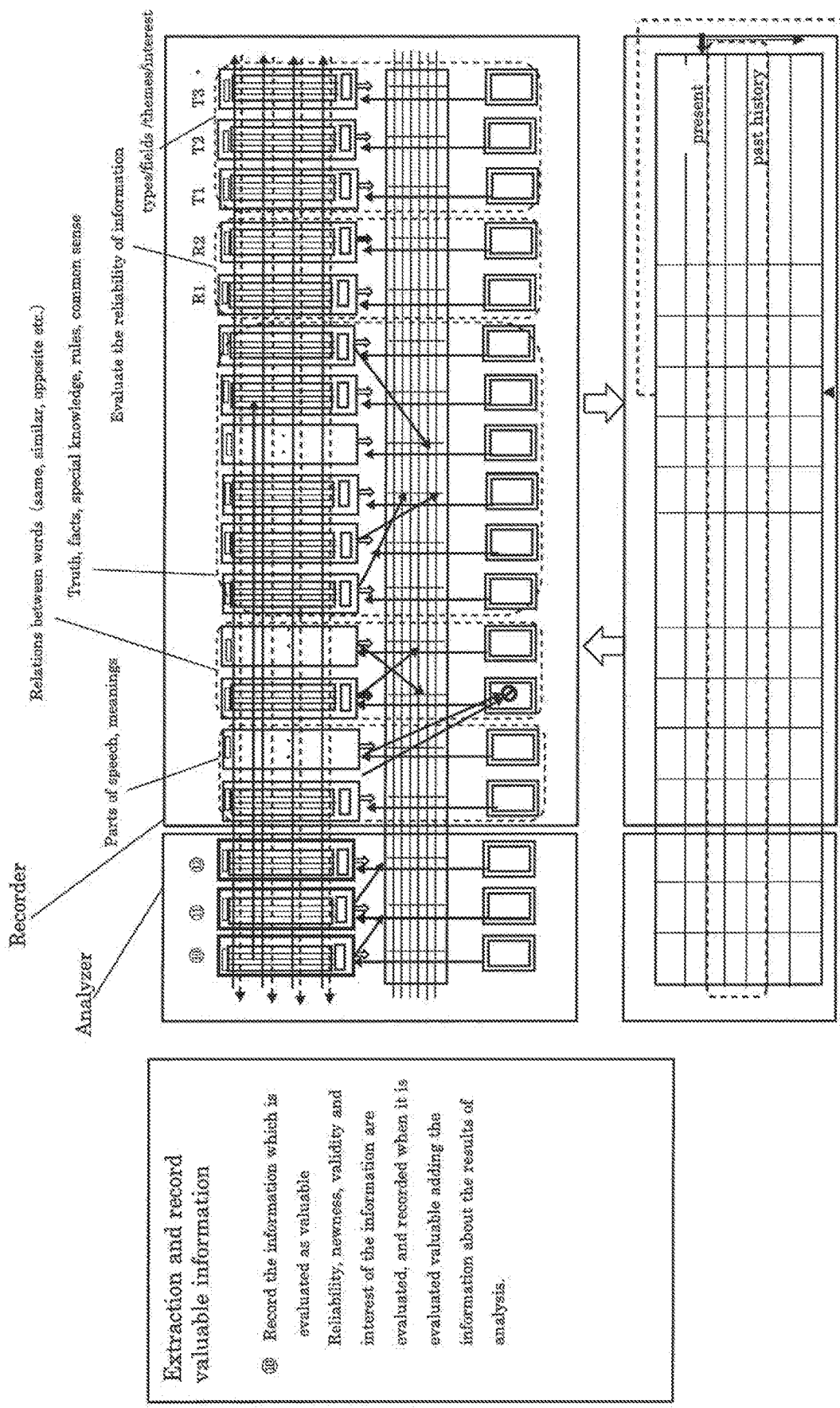
FIG. 15 shows a function to extract and record valuable information.
Figure 16:
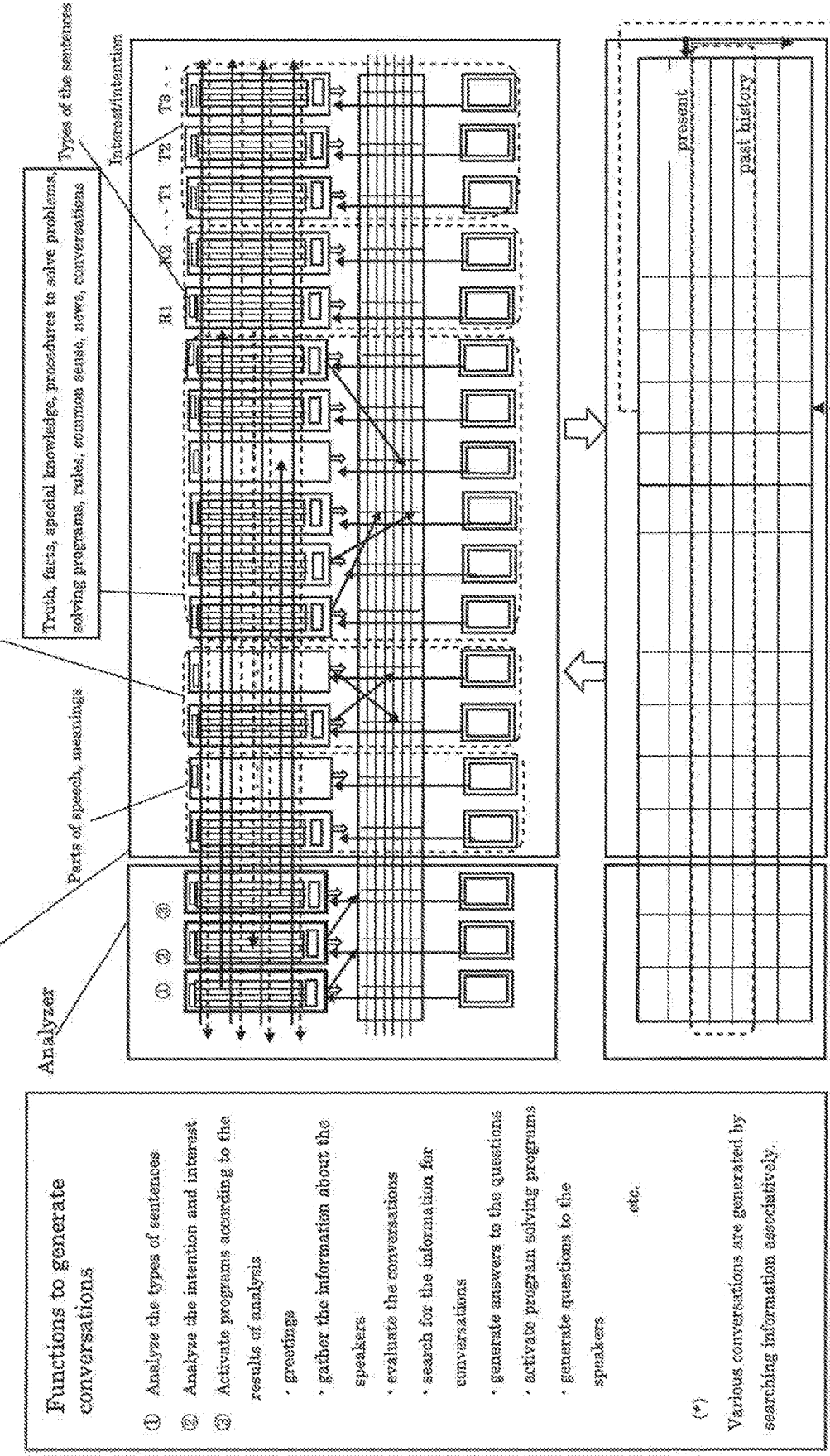
FIG. 16 shows a function to generate conversations.
Figure 17:
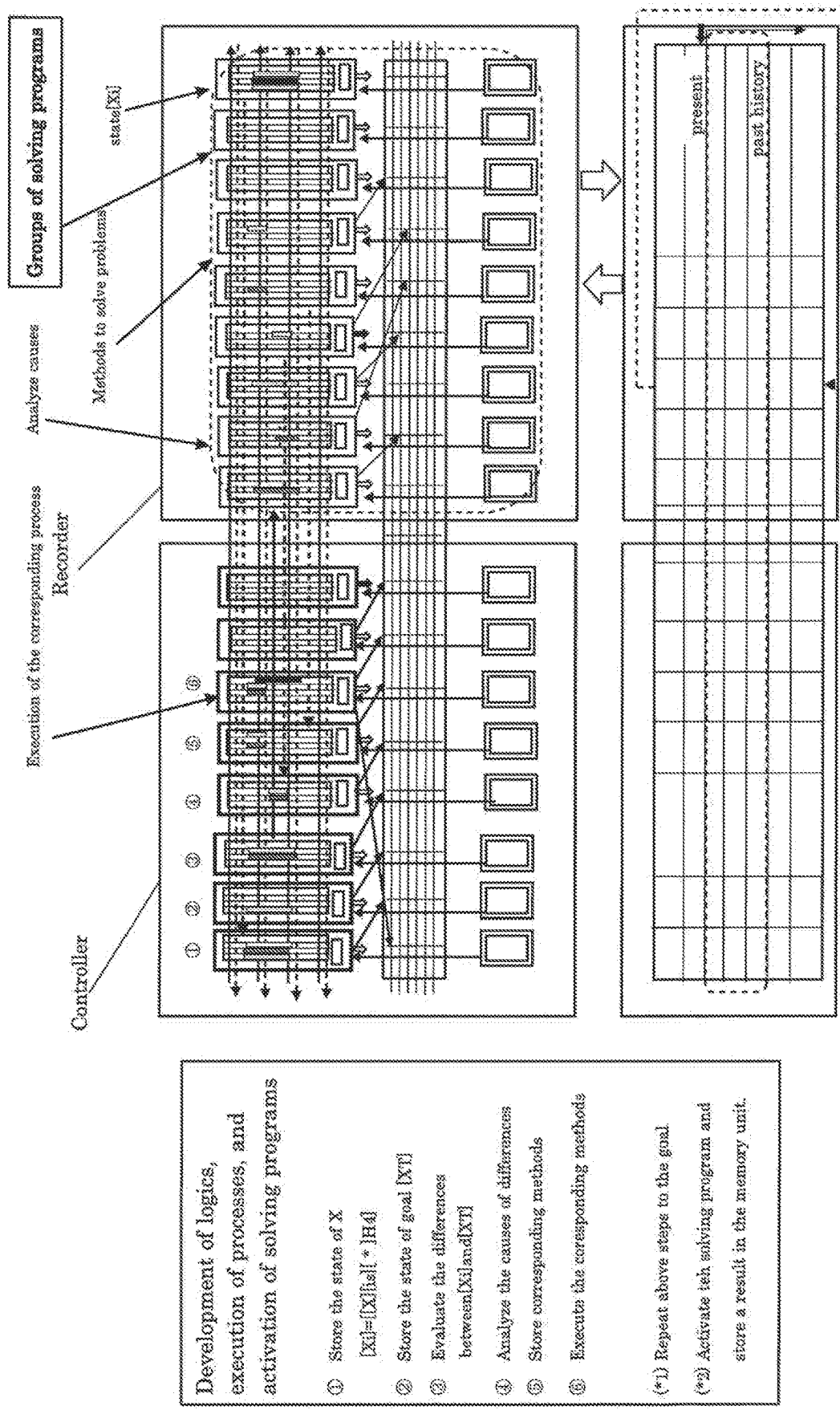
FIG. 17 shows a function to develop logics, activate and execute solving programs.
Figure 18:
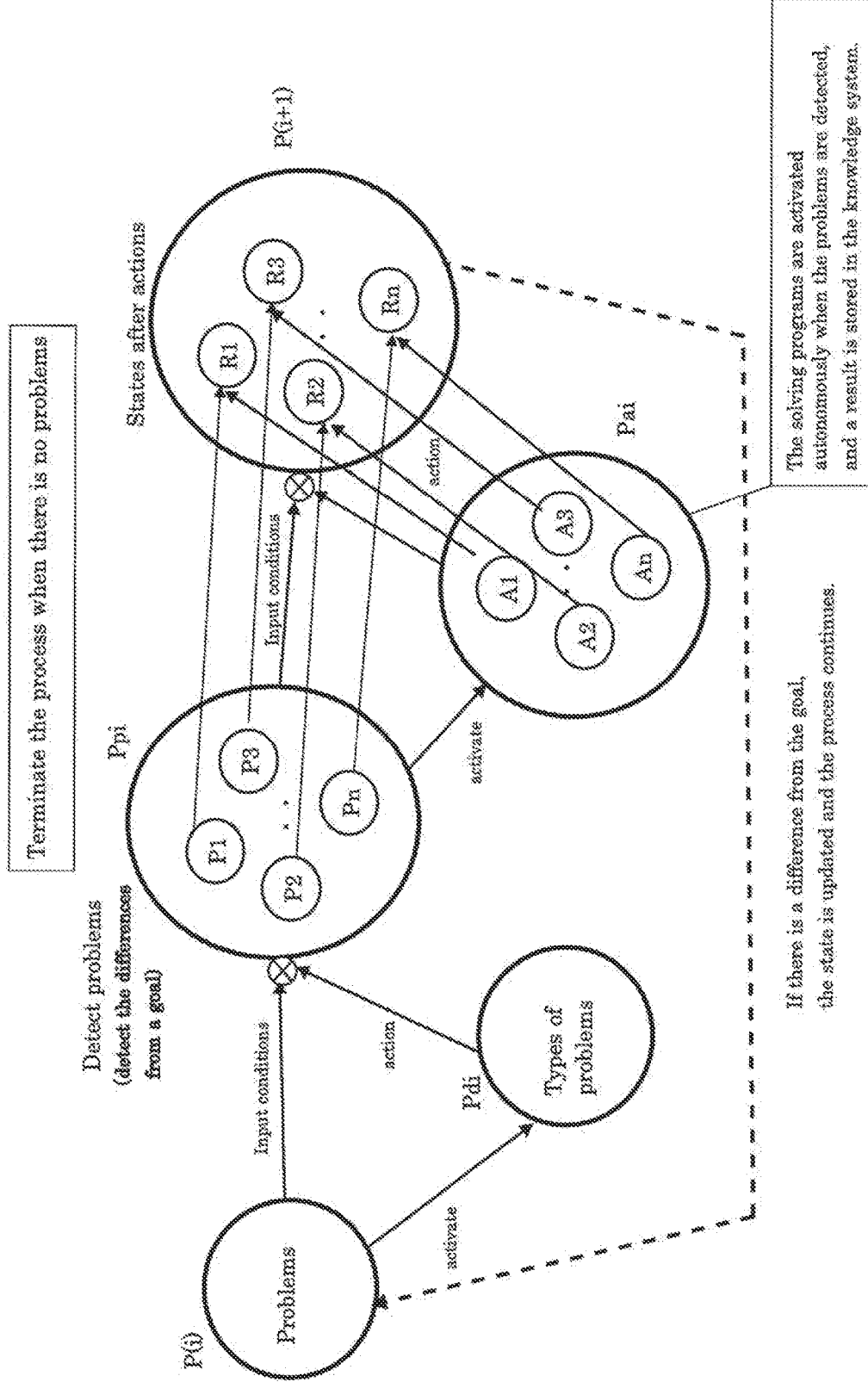
FIG. 18 shows a transition mode diagram of a function to develop logics, activate and execute solving programs.
Figure 19:
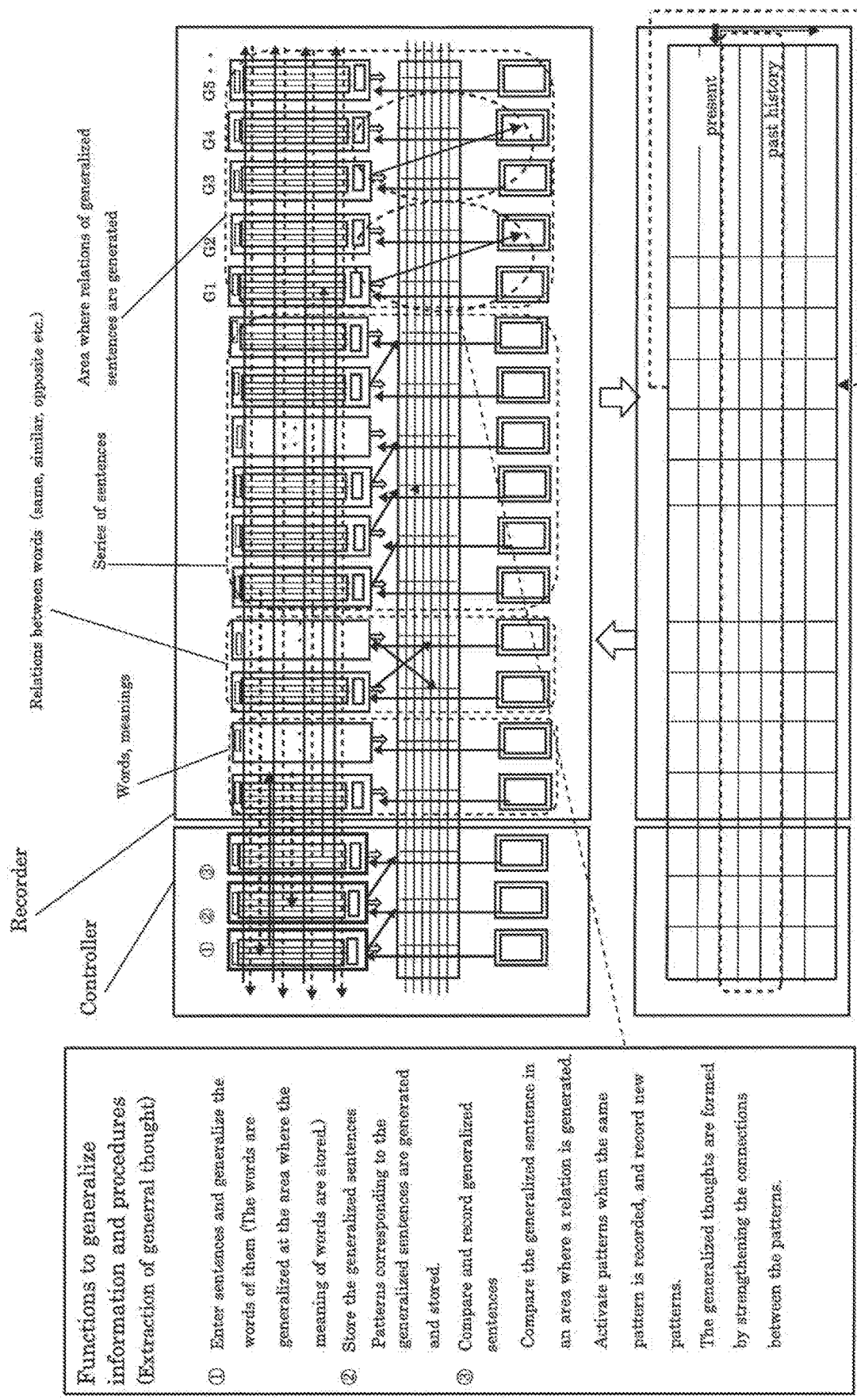
FIG. 19 shows a function to generalize information and procedures (extraction of common sense and general thoughts).
Figure 20:
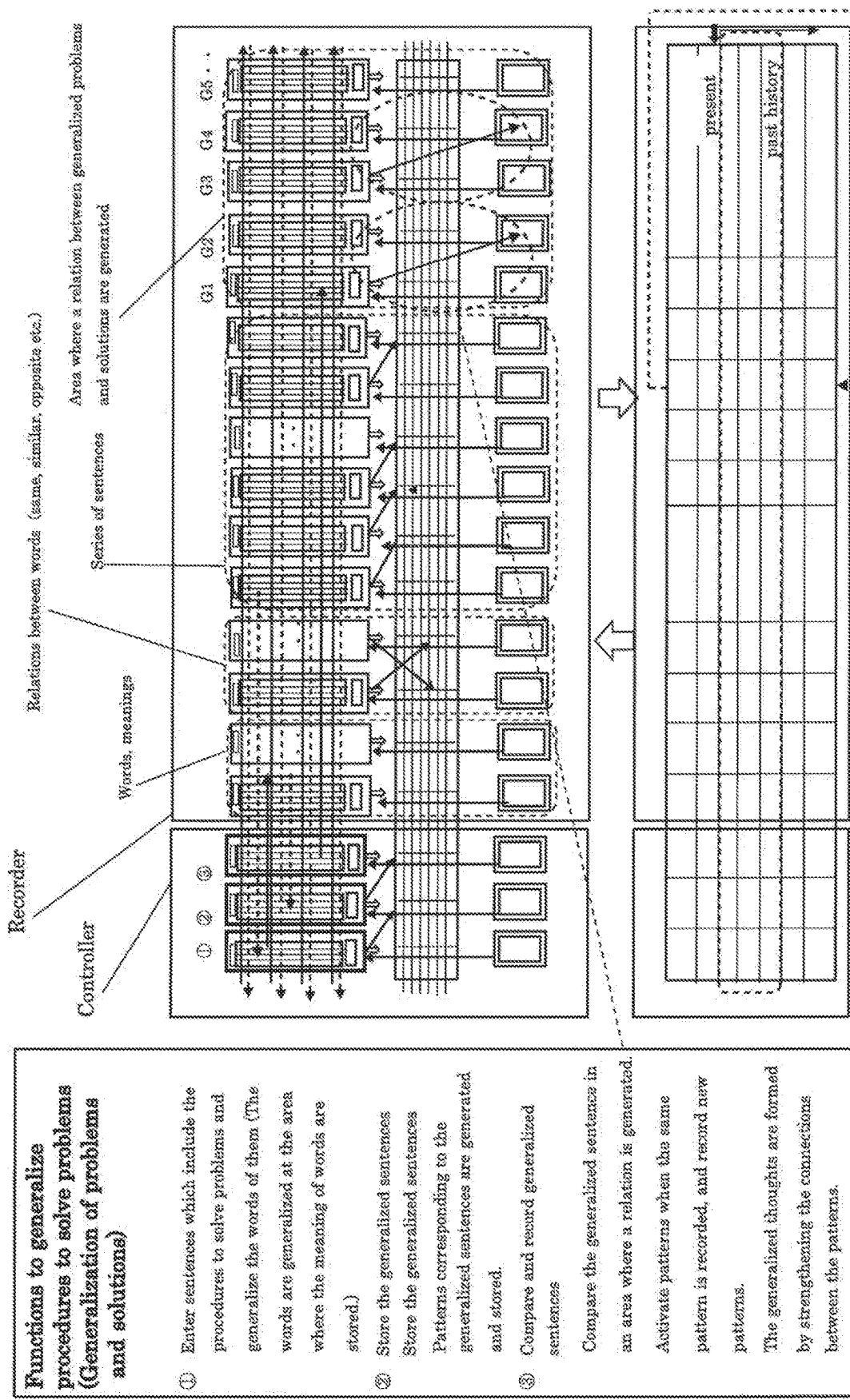
FIG. 20 shows a function to generalize information and procedures (generalization of methods and procedures to solve problems).
Figure 21:
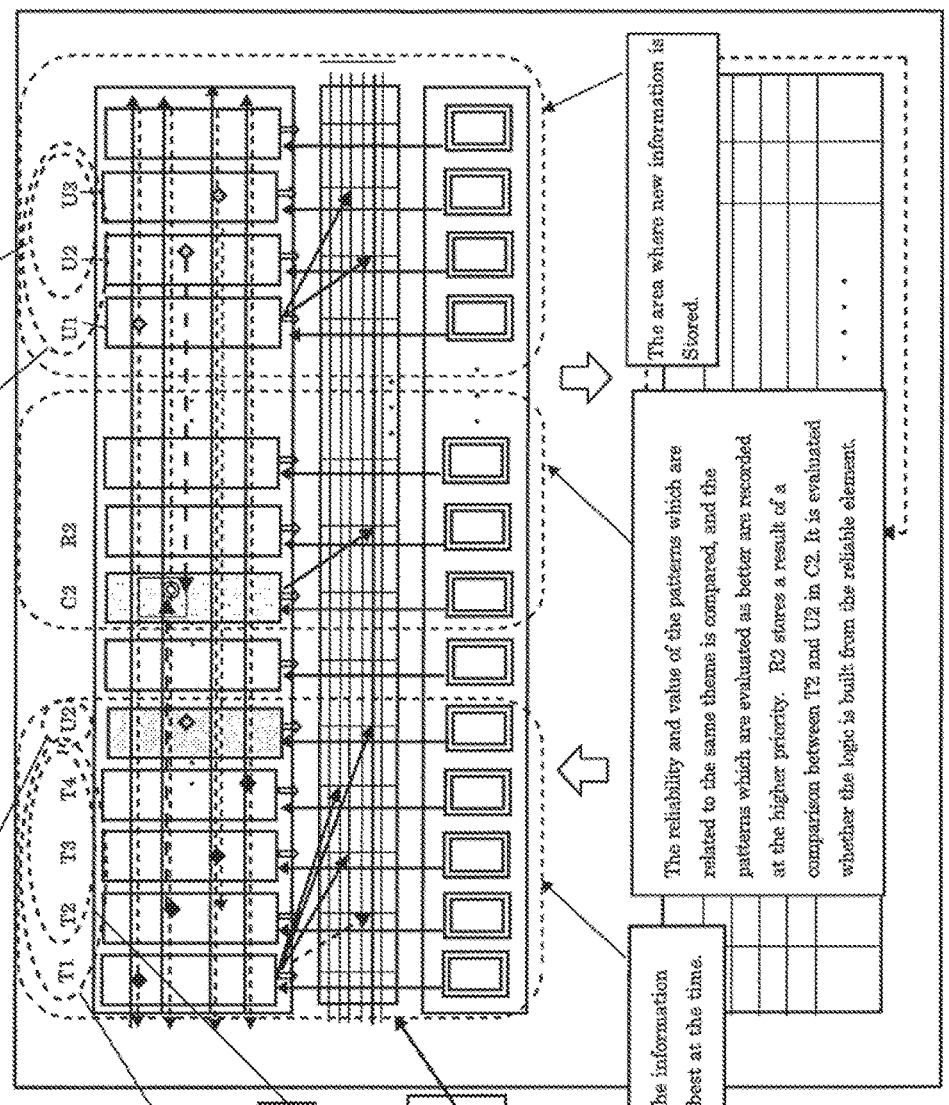
FIG. 21 shows a function to update to more significant knowledge and logic.
Figure 22:
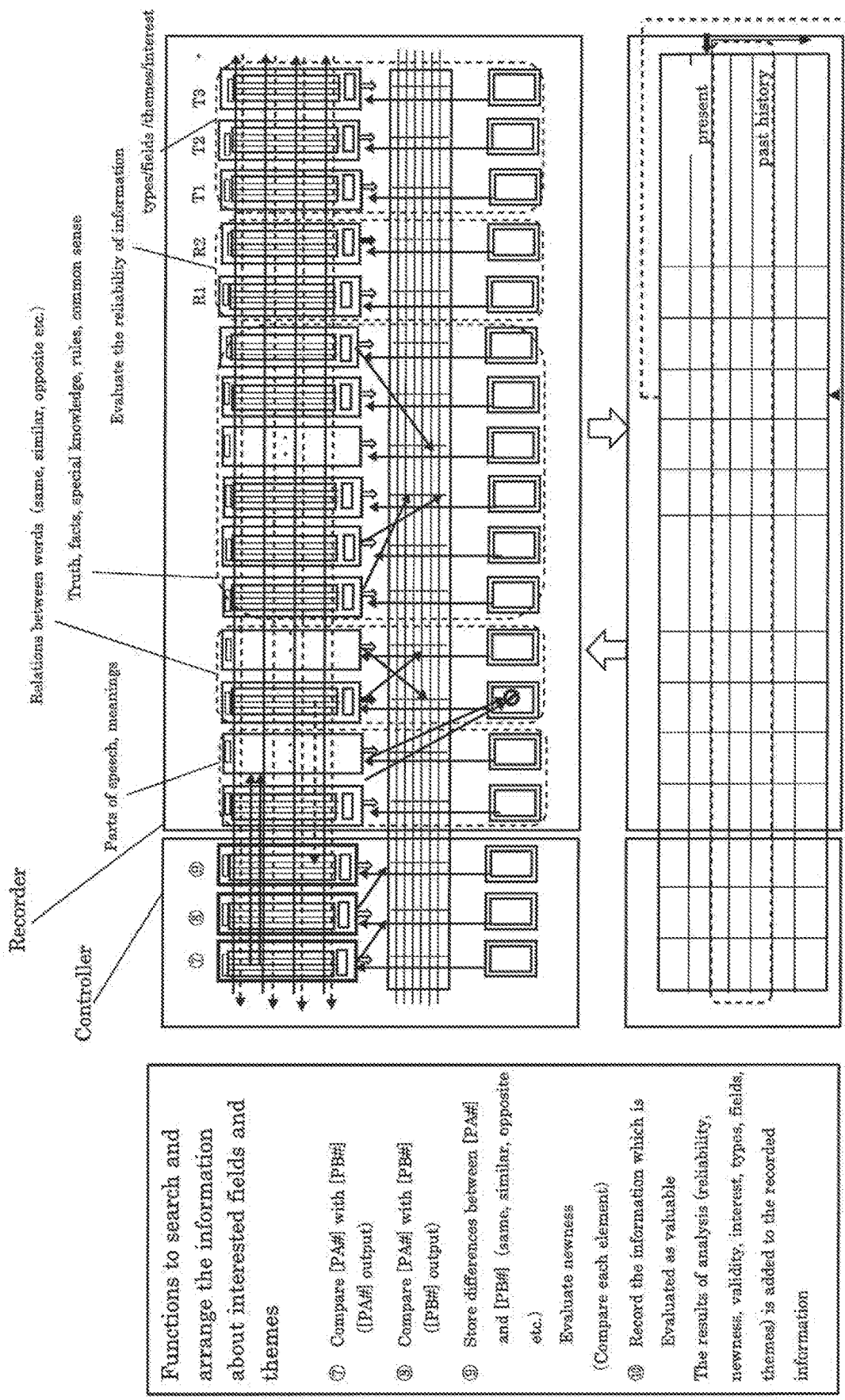
FIG. 22 shows a function to search and arrange information of interesting fields and themes.
Figure 23:
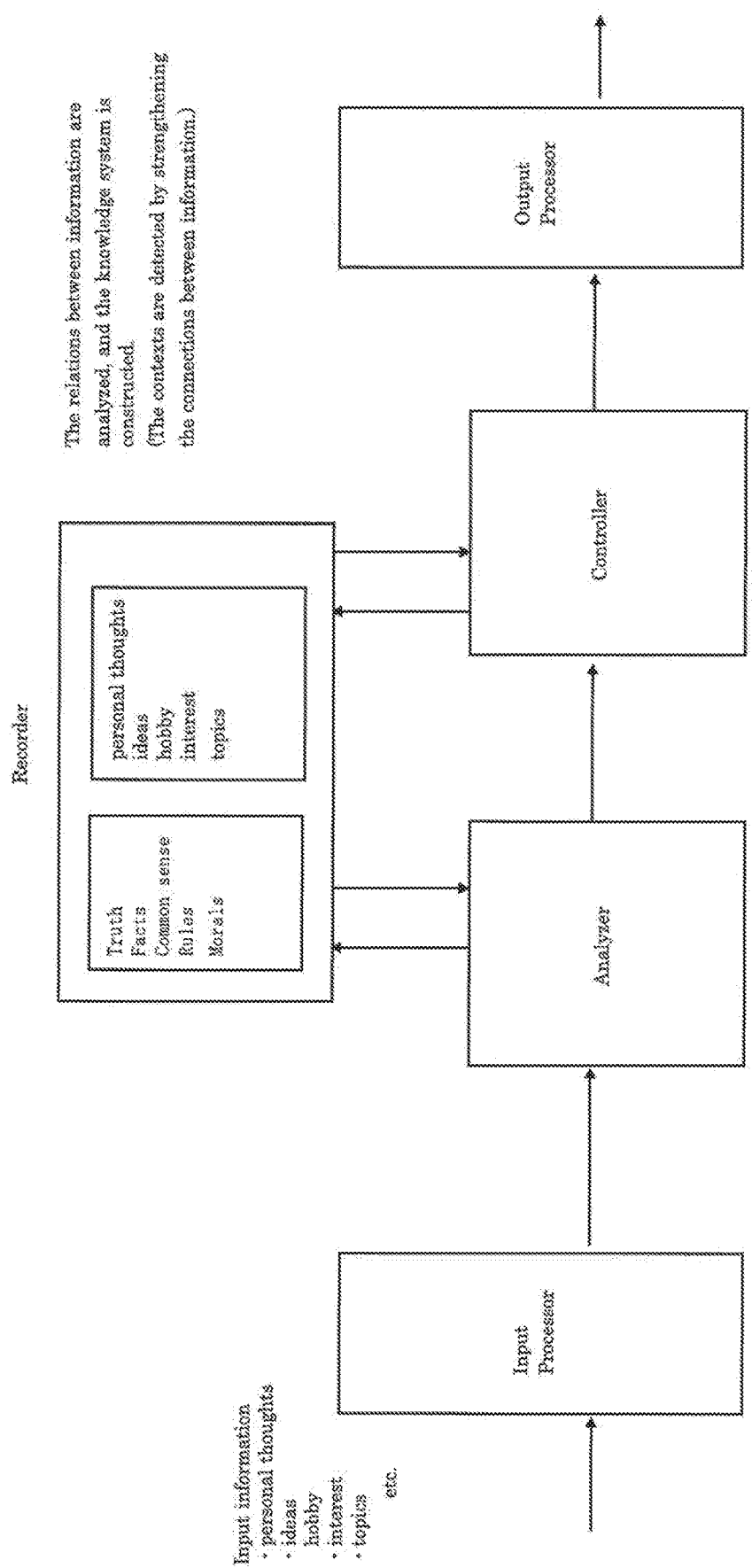
FIG. 23 shows a construction of Personal AI.
Figure 24:
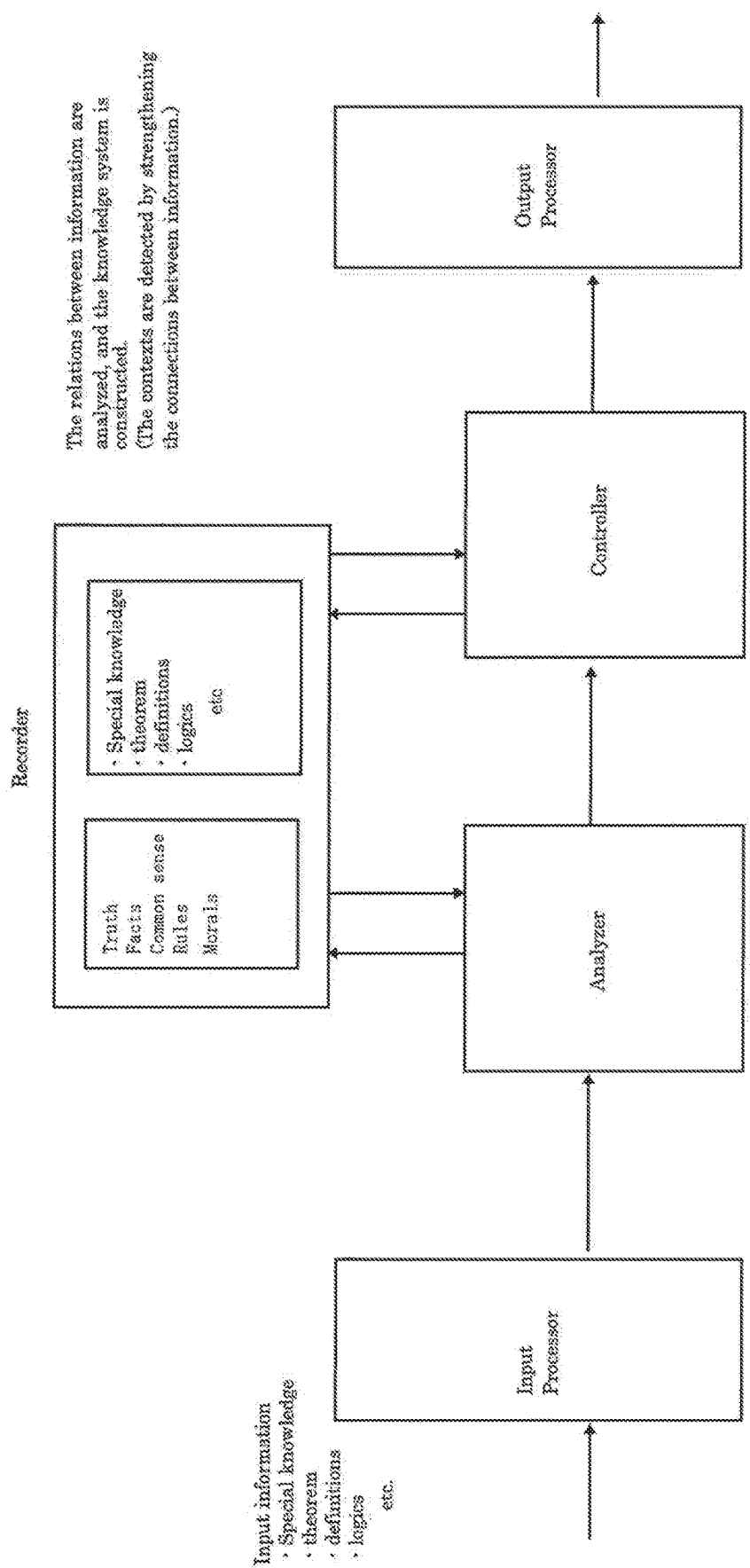
FIG. 24 shows a construction of General AI.
Figure 25:
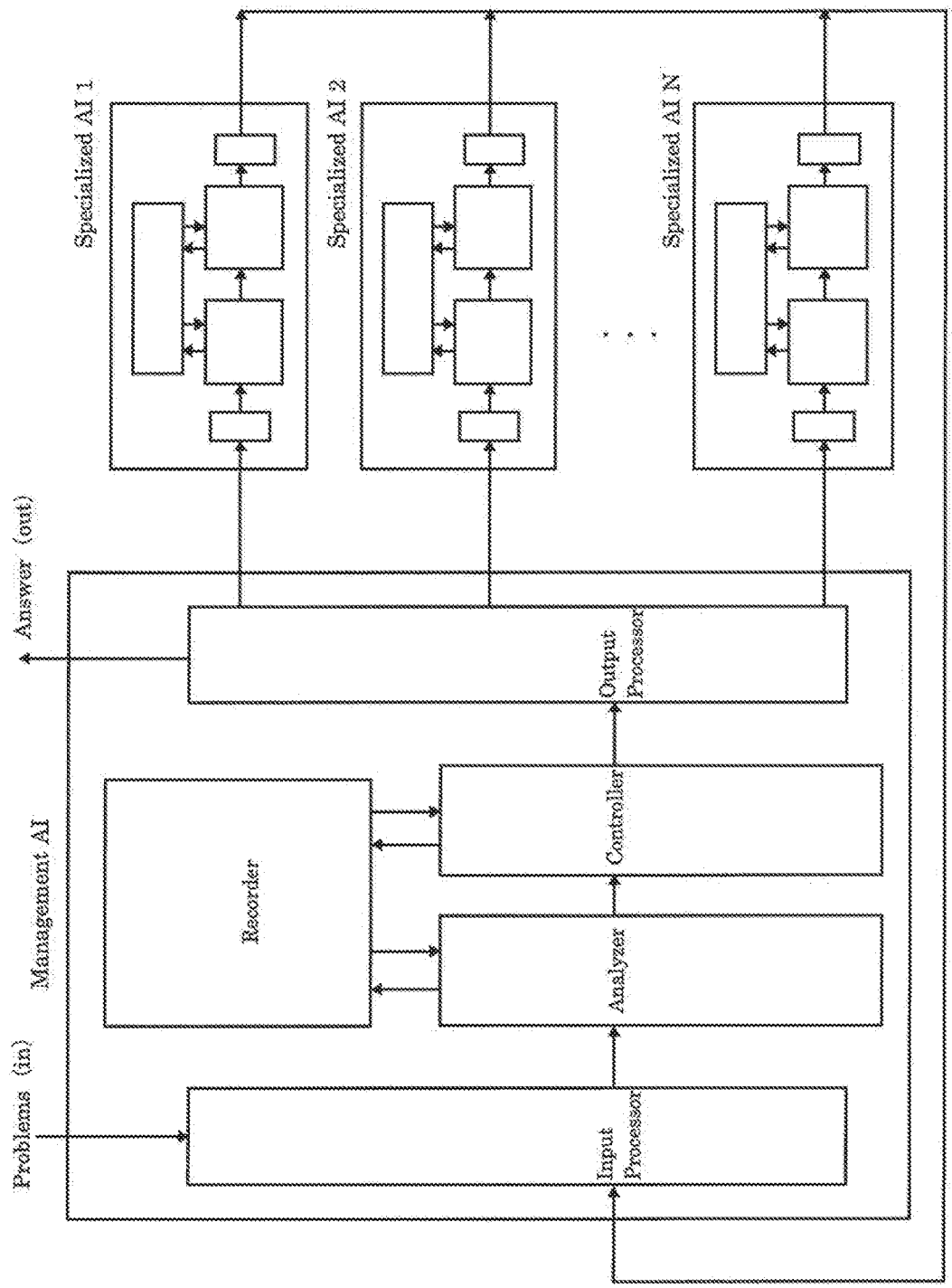
FIG. 25 shows a construction of Large Scale AI.
Figure 26:
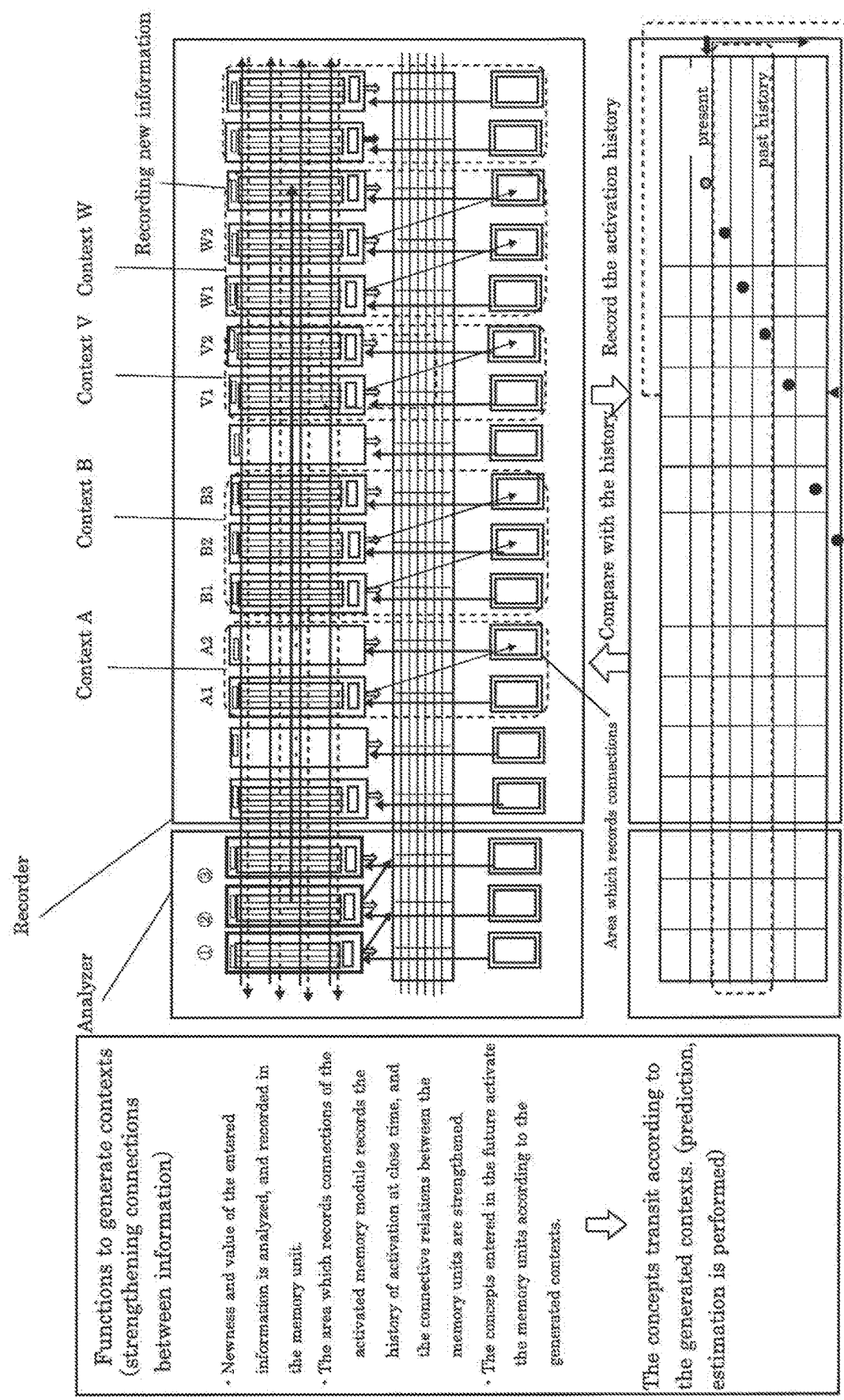
FIG. 26 shows a function to generate contexts (strengthening connective relations between information).

1: input processor
2: analyzer
3: recorder
4: controller
5: output processor

The invention claimed is:

1. An artificial intelligence apparatus comprising:
an input processor configured to convert input information to patterns, the input information including at least one of: a word, language, a sentence, knowledge, a numerical expression, a symbol, an image and sound;
an analyzer configured to analyze, of the patterns, at least one of: words, meanings, parts of speech, fields, reliability, newness, validity, comparison with recorded information, types of sentences, intention and relations between sentences, and the parts of speech including at least one of: subject, predicate, modifiers of the subject, modifiers of the predicate and relations between modifiers;
a recorder configured to record the patterns, resulting from analysis by the analyzer, and at least one of: a type of a problem, a method to solve the problem, connective relations and a relationship between the patterns, an activation history of the patterns, and an activation history of a program;
a controller configured to perform, autonomously using the patterns, at least one of:
a development of a process according to the result of analysis,
a search for information and a logic development to solve a problem based on the result of analysis, the type of the problem and the method to solve the problem,
an activation of a program according to the activation history of the program,
recording and updating of connective relations and relationship between the patterns,
a transition between the patterns to accomplish a goal for the problem, based on the result of analysis, and
record the patterns associatively, search for the pattern about a designated theme and a topic, and generate a conversation according to an intention of a speaker; and
an output processor configured to convert a result of the performance by the controller to information or control signals.

2. The artificial intelligence apparatus of claim 1, wherein the controller is configured to solve a problem autonomously using data of at least one of: truth, facts, special knowledge, rules, common sense, the input information and procedures instructed by language, recorded in the recorder.

3. The artificial intelligence apparatus of claim 1, wherein the controller is configured to evaluate the patterns and perform the processing according to the results of analysis autonomously, the processing including recording the patterns, updating a knowledge system, executing instructed items, and answering questions.

4. The artificial intelligence apparatus of claim 1, wherein the controller is configured to:
extract a useful relation by strengthening a relation between one group of patterns and another group of patterns, the relations associating the input information with a significant relation, and
construct at least one of: a generalized thought, a prediction, an estimate, and a common sense from the input information autonomously.

5. The artificial intelligence apparatus of claim 1, wherein the controller is configured to generate a procedure by searching related patterns from a knowledge system and the patterns converted by the input processor autonomously, and to proceed with processing considering a result of the processing autonomously.

6. The artificial intelligence apparatus of claim 1, wherein the analyzer is configured to:
  analyze at least one of: a source, reliability, newness, fields, themes, the subject, modifiers of the subject, the predicate, modifiers of the predicate, relations between modifiers, when, where, who, what, how, why, do what, the types of the sentences, numerical expressions, chemical expressions and relations with recorded patterns, the types of the sentences including at least one of: normal sentences, interrogative sentences, imperative sentences, and conditional sentences, truth, facts, rules, common sense, definitions, logics, explanations, assumptions, predictions, opinions, impressions, and rumors, of the patterns, and
  arrange and record into structures for easy searching.

7. The artificial intelligence apparatus of claim 1, wherein the controller is configured to, by using a knowledge system, analyze a situation, recognize a problem, search for information to solve the problems, activate a program to perform processing, generate information to solve the problem, install the information into the knowledge system, and solve the problem and expand the knowledge furthermore autonomously.

8. The artificial intelligence apparatus of claim 1, wherein the controller is configured to analyze a relation between the patterns converted by the input processor and recorded-patterns, extract and record the pattern converted by the input processor which is valuable and safe, construct, update and expand a knowledge system, search for the recorded patterns to solve a problem, activate a necessary program among various solving programs, generate information necessary to solve the problem, and solve the problem.

9. The artificial intelligence apparatus of claim 1, wherein the controller is configured to record, in the recorder, and output a pattern regarding designated information associatively.

10. The artificial intelligence apparatus of claim 1, wherein the controller is configured to compare a designated pattern with the recorded patterns in a knowledge system and evaluate at least one of: newness, a difference with the knowledge system, and a value of the designated pattern.

11. The artificial intelligence apparatus of claim 1, wherein the controller is configured to construct a knowledge system having a relation between the patterns and summarize or develop in detail using the relation between the patterns and the knowledge system autonomously.

12. The artificial intelligence apparatus of claim 1, wherein the controller is configured to detect and learn a context using the activation history of the patterns and generate conversations according to the context including at least one of: a question, a response, a confirmation, generation of an associated topic, an opinion, and an argument.

13. The artificial intelligence apparatus of claim 1, wherein the controller is configured to:
  detect and learn a context using the activation history of the patterns and generate a conversation according to the context including at least one of: a question, a response, a confirmation, generation of an associated topic, an opinion, and an argument;
  gather information about a designated speaker or a topic including at least one of: an interested topic, a thought about a problem, a response to a phenomenon, an opinion, an action, and a detailed information; and
  record and accumulate in a knowledge system.

14. The artificial intelligence apparatus of claim 1, wherein the controller is configured to analyze the relations between a pattern converted by the input processor and the recorded patterns, construct, expand and update a knowledge system by extracting a pattern converted by the input processor which is valuable, and solve problems using the knowledge system, relations between the patterns and a pattern generated by the input processor.

15. A computer implemented method for realizing an artificial intelligence, comprising:
  converting input information to patterns, the input information including at least one of: a word, language, a sentence, knowledge, a numerical expression, a symbol, an image and sound;
  analyzing, of the patterns, at least one of: words, meanings, parts of speech, fields, reliability, newness, validity, comparison with recorded patterns, types of sentences, and intention and relations between sentences of the input information, and the parts of speech including at least one of: subject, predicate, modifiers of the subject, modifiers of the predicate and relations between modifiers;
  recording the patterns, resulting from the analysis, and at least one of: a type of a problem, a method to solve the problem, connective relations and a relationship between the patterns, an activation history of the patterns, and an activation history of a program;
  performing, autonomously with the patterns, at least one of:
    a development of a process according to the result of analysis,
    a search for information and a logic development to solve a problem with the result of analysis, the type of the problem and the method to solve the problem,
    an activating a program according to the activation history of the program,
    recording and updating of connective relations and relationship between the patterns;
    a transition between the patterns to accomplish a goal for the problem, based on the result of analysis;
  converting a result of the autonomous performance to information or control signals; and
  recording the patterns associatively, searching for the pattern about a designated theme and a topic, and generating a conversation according to an intention of a speaker.

16. The computer implemented method for realizing an artificial intelligence of claim 15, further comprising solving a problem autonomously using data of at least one of: recorded truth, facts, special knowledge, rules, common sense, the input information and procedures instructed by language.

17. The computer implemented method for realizing an artificial intelligence of claim 15, further comprising evaluating the patterns and performing the processing according to the results of analysis autonomously, the processing including recording the patterns, updating a knowledge system, executing instructed items, and answering questions.

18. The computer implemented method for realizing an artificial intelligence of claim 15, further comprising:
  extracting a useful relation by strengthening a relation between one group of patterns and another group of patterns, the relations associating the input information with a significant relation, and
  constructing at least one of: a generalized thought, a prediction, an estimate, and a common sense from the input information autonomously.

19. The computer implemented method for realizing an artificial intelligence of claim 15, further comprising generating a procedure by searching patterns from a knowledge system and the converted patterns autonomously, and proceeding with processing considering a result of the processing autonomously.

20. The computer implemented method for realizing an artificial intelligence of claim 15, further comprising:
  analyzing at least one of: a source, reliability, newness, fields, themes, the subject, modifiers of the subject, the predicate, modifiers of the predicate, relations between modifiers, when, where, who, what, how, why, do what, the types of the sentences, numerical expressions, chemical expressions and relations with recorded patterns, the types of the sentences including at least one of: normal sentences, interrogative sentences, imperative sentences, and conditional sentences, truth, facts, rules, common sense, definitions, logics, explanations, assumptions, predictions, opinions, impressions, and rumors, of the patterns, and
  arranging and recording into the structures for easy searching.

21. The computer implemented method for realizing an artificial intelligence of claim 15, further comprising, by using a knowledge system, analyzing a situation, recognizing a problem, searching for information to solve the problem, activating a programs to perform processing, generating information to solve the problem, installing the information into the knowledge system, solving the problem and expanding the knowledge furthermore autonomously.

22. The computer implemented method for realizing an artificial intelligence of claim 15, further comprising analyzing a relation between the converted patterns and recorded patterns, extracting and recording the converted pattern which is valuable and safe, constructing, updating and expanding a knowledge system, searching for the recorded pattern to solve the problem, activating a necessary program among various solving programs, generating information necessary to solve the problem, and solving the problem.

23. The computer implemented method for realizing an artificial intelligence of claim 15, further comprising recording and outputting a pattern regarding designated information associatively.

24. The computer implemented method for realizing an artificial intelligence of claim 15, further comprising comparing a designated pattern with the recorded patterns in a knowledge system and evaluating at least one of: newness, a difference with the knowledge system, and a value of the designated pattern.

25. The computer implemented method for realizing an artificial intelligence of claim 15, further comprising constructing a knowledge system having a relation between the patterns and summarizing or developing in detail using the relation between the patterns and the knowledge system autonomously.

26. The computer implemented method for realizing an artificial intelligence of claim 15, further comprising detecting and learning a context using the activation history of the patterns and generating conversations according to the context including at least one of: a question, a response, a confirmation, generation of an associated topic, an opinion, and an argument.

27. The computer implemented method for realizing an artificial intelligence of claim 15, further comprising:
  detecting and learning a context using the activation history of the patterns and generating a conversation according to the context including at least one of: a question, a response, a confirmation, generation of an associated topic, an opinion, and an argument;
  gathering information about a designated speaker or a topic including at least one of: an interested topic, a thought about a problem, a response to a phenomenon, an opinion, an action, and a detailed information; and
  recording and accumulating in a knowledge system.

* * * * *